(12) United States Patent
Gu et al.

(10) Patent No.: US 12,189,420 B2
(45) Date of Patent: Jan. 7, 2025

(54) DISPLAY DEVICE INCLUDING DIGITIZER DEFINING VIA-HOLE

(71) Applicant: Samsung Display Co., Ltd., Yongin-si (KR)

(72) Inventors: Dasom Gu, Asan-si (KR); Jaiku Shin, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 204 days.

(21) Appl. No.: 17/890,687

(22) Filed: Aug. 18, 2022

(65) Prior Publication Data

US 2023/0084467 A1 Mar. 16, 2023

(30) Foreign Application Priority Data

Sep. 14, 2021 (KR) ........................ 10-2021-0122692

(51) Int. Cl.
*G06F 1/16* (2006.01)

(52) U.S. Cl.
CPC .......... *G06F 1/1616* (2013.01); *G06F 1/1643* (2013.01); *G06F 1/1652* (2013.01); *G06F 1/1656* (2013.01)

(58) Field of Classification Search
CPC ......... G06F 2203/04102; G06F 3/0412; G06F 1/1643; G06F 1/1641; G06F 1/1618; G06F 1/1616
See application file for complete search history.

(56) References Cited

U.S. PATENT DOCUMENTS

| 7,307,616 | B2 | 12/2007 | Katsuhito et al. |
| 8,089,475 | B2 | 1/2012 | Ito |
| 2013/0234730 | A1* | 9/2013 | Kobori ................... G01B 7/004 324/654 |
| 2022/0129094 | A1* | 4/2022 | Tatsuno ................ G06F 1/1652 |
| 2023/0259244 | A1* | 8/2023 | Kobori .................... G06F 3/046 345/173 |

FOREIGN PATENT DOCUMENTS

KR 1020200132150 A 11/2020

* cited by examiner

*Primary Examiner* — Yuzhen Shen
(74) *Attorney, Agent, or Firm* — CANTOR COLBURN LLP

(57) ABSTRACT

A display device includes a display panel including a first non-folding region, a second non-folding region, and a folding region disposed between the first non-folding region and the second non-folding region, and a digitizer including a base layer, first conductive lines disposed on the base layer, a first cover layer disposed on the first conductive lines, second conductive lines disposed on the first cover layer, a second cover layer disposed on the second conductive lines. Via-holes pass through the first cover layer, a second conductive line of the second conductive lines is electrically connected to a first conductive line of the first conductive lines through the via-holes, and the via-holes overlap the folding region.

19 Claims, 15 Drawing Sheets

DISPLAY DEVICE INCLUDING DIGITIZER DEFINING VIA-HOLE

This application claims priority to Korean Patent Application No. 10-2021-0122692, filed on Sep. 14, 2021, and all the benefits accruing therefrom under 35 U.S.C. § 119, the content of which in its entirety is herein incorporated by reference.

BACKGROUND

1. Field

Embodiments of the invention herein relate to a display device, and more particularly, to a foldable display device.

2. Description of the Related Art

A display device includes a display region activated in accordance with an electrical signal. The display device may sense an input applied from the outside through the display region, and simultaneously display various images to provide information to a user. With a recent development of display devices having various shapes, display regions having various shapes are implemented.

SUMMARY

Embodiments of the invention provide a foldable display with improved reliability.

An embodiment of the invention provides a display device including a display panel including a first non-folding region, a second non-folding region, and a folding region disposed between the first non-folding region and the second non-folding region, and a digitizer including a base layer, first conductive lines disposed on the base layer, a first cover layer disposed on the first conductive lines, second conductive lines disposed on the first cover layer, a second cover layer disposed on the second conductive lines. Via-holes may pass through the first cover layer, a second conductive line of the second conductive lines is electrically connected to a first conductive line of the first conductive lines through the via-holes, and the via-holes overlap the folding region.

In an embodiment, the first conductive line of the first conductive lines and the second conductive line of the second conductive lines connected by the via-holes may define a closed curve.

In an embodiment, a gap between any two neighboring via-holes among the via-holes may be greater than or equal to an average size of the via-holes.

In an embodiment, a number of via-holes defined in a same column among the via-holes may be 2 or less.

In an embodiment, when n via-holes are defined in a same row among the via-holes, where n may be an integer of 2 or greater, a distance between any two neighboring via-holes in the same row among the n via-holes may be n times an average size of the via-holes.

In an embodiment, when two via-holes are defined in the same column among the via-holes, a distance between the two via-holes may be two times an average size of the via-holes.

In an embodiment, the via-holes may be defined in different columns.

In an embodiment, the via-holes may be defined in different rows.

In an embodiment, the via-holes may include a first via-hole, a second via-hole, a third via-hole, a fourth via-hole, and a fifth via-hole, where the first via-hole, the third via-hole, and the fifth via-hole may be defined in a first row, the second via-hole and the fourth via-hole may be disposes in a second row, and the first to fifth via-holes may be respectively defined in first to fifth columns.

In an embodiment, the first non-folding region, the folding region, and the second non-folding region may be distinguished on a first direction, each of the first conductive lines may be extended in the first direction in a plan view, and each of the second conductive lines may be extended in a second direction crossing the first direction.

In an embodiment, the first non-folding region, the folding region, and the second non-folding region may be distinguished on an first direction, each of the first conductive lines may be extended in a second direction crossing the first direction in a plan view, and each of the second conductive lines may be extended in the first direction in the plan view.

In an embodiment, the digitizer may include a first portion overlapping the folding region and being foldable around a virtual folding axis, a second portion overlapping the first non-folding region, and a third portion overlapping the second non-folding region.

In an embodiment, a via-hole of the via-holes may be defined in the first portion.

In an embodiment, the digitizer may include a first digitizer and a second digitizer spaced apart from each other, where the first digitizer may overlap at least a portion of the folding region and the second non-folding region, and the second digitizer may overlap at least a portion of the folding region and the first non-folding region, and the via-holes may be defined in the first digitizer and the second digitizer.

In an embodiment, the display device may further include an electromagnetic shielding layer disposed on a lower portion of the digitizer.

In an embodiment of the invention, a display device includes a window module, and a display module disposed on the window module and including a first non-folding region, a folding region, and a second non-folding region sequentially defined on a first direction, a display panel, and a digitizer including first conductive lines extended in a second direction crossing the first direction and second conductive lines extended in the first direction and disposed in a different layer from the first conductive lines, and disposed on a first surface of the display panel which is opposite to a second surface of the display panel on which the window module is disposed. A plurality of via-holes overlapping the folding region is defined in the digitizer, and a second conductive line of the second conductive lines is electrically connected to a first conductive line of the first conductive lines through the plurality of via-holes.

In an embodiment, a number of via-holes defined in a same column among the via-holes may be 2 or less.

In an embodiment, when a number of via-holes defined in one row is n, where n may be an integer of 2 or greater, a distance between any two neighboring via-holes among the n via-holes may be n times an average size of the via-holes.

In an embodiment, the display module may further include a lower member disposed on a first surface of the digitizer opposite to a second surface of the digitizer facing the display panel is disposed, where the lower member may include at least one of an electromagnetic shielding layer, a heat dissipating layer, a cushion layer, or a metal plate.

In an embodiment of the invention, a display device includes a display panel including a first non-folding region, a second non-folding region, and a folding region disposed between the first non-folding region and the second non-folding region, and a digitizer including a plurality of insulation layers, first conductive lines and second conductive lines disposed between the plurality of insulation layers, a first portion at least a portion of which overlaps the folding region and which has flexibility, a second portion overlapping the first non-folding region, and a third portion overlapping the second non-folding region. Via-holes pass through an insulation layer of the plurality of insulation layers, overlap the display panel, and defined in the first portion, a second conductive line of the second conductive lines is connected to a first conductive line of the first conductive lines through the via-holes and constitute a closed curve, and a spacing gap between any two neighboring via-holes among the via-holes is greater than or equal to an average size value of the via-holes.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
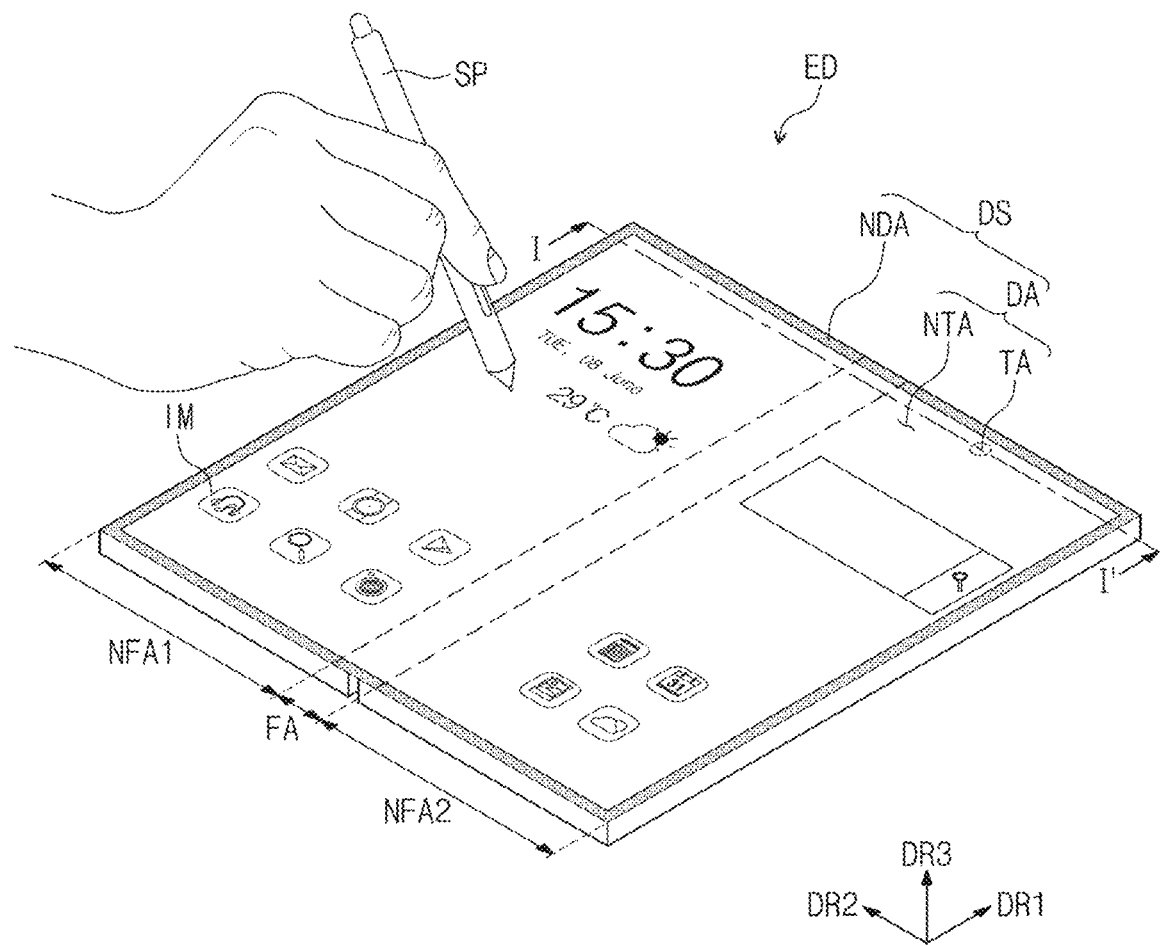
FIG. 1A to FIG. 1C are perspective views of an embodiment of an electronic device according to the invention.

In the disclosure, when an element (or a region, a layer, a portion, and the like) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or," includes all combinations of one or more of which associated components may define.

It will be understood that, although the terms "first", "second", etc. may be used herein to describe various elements, these elements should not be limited by these terms. These terms are only used to distinguish one element from another. A first element may be referred to as a second element, and a second element may also be referred to as a first element in a similar manner without departing the scope of rights of the invention, for example. The terms of a singular form may include plural forms unless the context clearly indicates otherwise.

In addition, terms such as "below," "lower," "above," "upper," and the like are used to describe the relationship of the components shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within +30%, 20%, 10%, 5% of the stated value, for example.

Unless otherwise defined, all terms (including technical and scientific terms) used herein have the same meaning as commonly understood by one of ordinary skill in the art to which the invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, embodiments of the invention will be described with reference to the accompanying drawings.

Figure 1B:
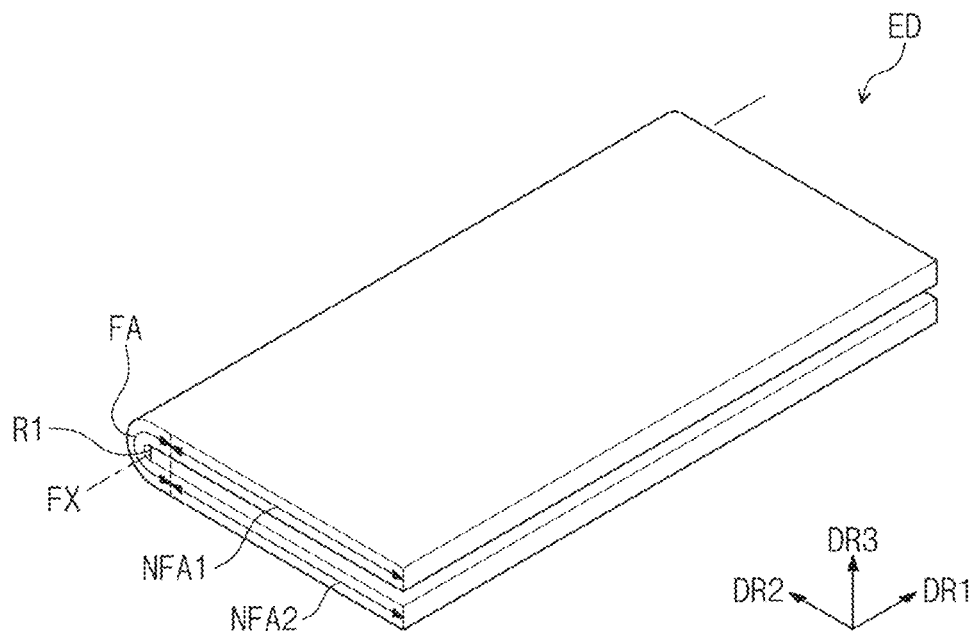
Figure 1C:
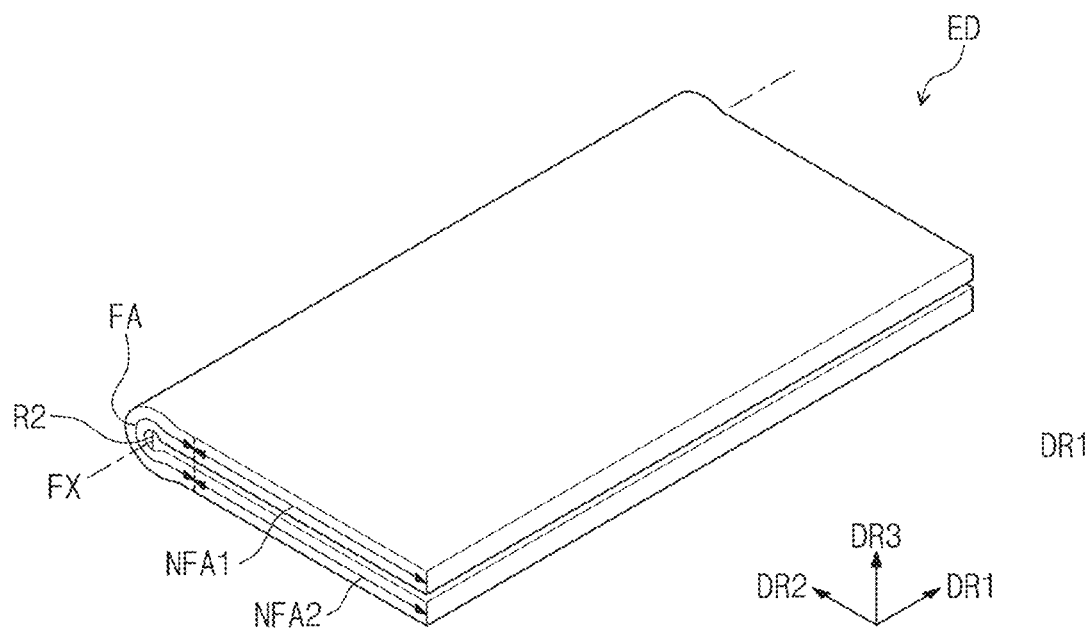

FIG. 1A to FIG. 1C are perspective views of an embodiment of an electronic device ED according to the invention. FIG. 1A illustrates the electronic device ED in an unfolded state, and FIG. 1B and FIG. 1C illustrate the electronic device ED in a folded state.

Referring to FIG. 1A to FIG. 1C, the electronic device ED in an embodiment of the invention may include a display surface DS defined by a first direction DR1 and a second direction DR2 crossing the first direction DR1. The display surface DS may correspond to a front surface of the electronic device ED. An image IM may include a moving image as well as a still image. The electronic device ED may provide the image IM to a user through the display surface DS.

The display surface DS may include a display region DA and a non-display region NDA around the display region DA. The display region DA may display the image IM, and the non-display region NDA may not display the image IM. The non-display region NDA may surround the display region DA. However, the invention is not limited thereto. The shape of the display region DA, and a shape of the non-display region NDA may be vary. In an alternative embodiment, the non-display region NDA may be omitted.

The display region DA may include a transmissive region TA and a non-transmissive region NTA. The transmissive region TA may be a region through which natural light, infrared light, or the like pass. Through the transmissive region TA, the electronic device ED may sense an external object or provide a sound signal such as voice to the outside. The non-transmissive region NTA may display the image IM in a third direction DR3.

Hereinafter, a direction substantially perpendicularly crossing a plane defined by the first direction DR1 and the second direction DR2 is defined as the third direction DR3. In addition, in the disclosure, "in a plan view" may be defined as a state viewed in the third direction DR3.

A front surface (or an upper surface) and a back surface (or a lower surface) of each component are defined on the basis of the third direction DR3. The front surface and the back surface oppose each other in the third direction DR3, and the normal direction of each of the front surface and the back surface may be parallel to the third direction DR3.

The separation distance between the front surface and the back surface in the third direction DR3 may correspond to the thickness/height of the electronic device ED in the third direction DR3. Directions indicated by the first to third directions DR1, DR2, and DR3 are a relative concept, and may be converted to different directions.

The electronic device ED may sense an external input applied from the outside. The external input may include various forms of inputs provided from the outside of the electronic device ED.

In an embodiment, the external input may be a user input, for example. The user input may include various forms of inputs such as a part of a user's body, an electromagnetic instrument (e.g., electromagnetic pen SP), light, heat, pressure, or the like.

In an embodiment, the external input may include not only a contact by a part of a user's body, such as a hand, but also an external input applied in close proximity, or adjacent to the electronic device ED at a predetermined distance (e.g., hovering), for example. Also, the external input may have various forms such as force, pressure, temperature, light, or the like. In addition, the electronic device ED according to the invention may sense an external input by the electromagnetic pen SP which generates a magnetic field. In addition, the electronic device ED may sense a plurality of inputs of different forms. In an embodiment, the electronic device ED may sense an external input by the electromagnetic pen SP and an external input by a user's hand, for example.

FIG. 1A illustrates an external input through a user's electromagnetic pen SP. Although not illustrated, the electromagnetic pen SP may be mounted and demounted inside or outside of the electronic device ED, and the electronic device ED may provide and receive a signal corresponding to the mounting and demounting of the electromagnetic pen SP.

The electronic device ED may include a folding region FA and a plurality of non-folding regions NFA1 and NFA2. The non-folding regions NFA1 and NFA2 may include a first non-folding region NFA1 and a second non-folding region NFA2. In the second direction DR2, the folding region FA may be disposed between the first non-folding region NFA1 and the second non-folding region NFA2.

As illustrated in FIG. 1B, the folding region FA may be folded with respect to a folding axis FX parallel to the first direction DR1. The folding region FA has a predetermined curvature and a predetermined curvature diameter R1. The first non-folding region NFA1 and the second non-folding region NFA2 face each other, and the electronic device ED may be in-folded such that the display surface DS is not exposed to the outside.

In an embodiment of the invention, the electronic device ED may be out-folded such that the display surface DS is exposed to the outside. In an embodiment of the invention, the electronic device ED may be configured such that an in-folding or outer-folding operation may be alternatively repeated from an un-folding operation, but the invention is not limited thereto. In an embodiment of the invention, the electronic device ED may select one of the un-folding operation, the in-folding operation, and the outer-folding operation.

As illustrated in FIG. 1B, a distance between the first non-folding region NFA1 and the second non-folding region NFA2 may be substantially the same as the curvature diameter R1. However the invention is not limited thereto. As illustrated in FIG. 1C, a curvature diameter R2 may be greater than the distance between the first non-folding region NFA1 and the second non-folding region NFA2.

FIG. 1B and FIG. 1C are illustrated with respect to the display surface DS, and a case EDC (refer to FIG. 2) forming the appearance of the electronic device ED may contact end regions of the first non-folding region NFA1 and the second non-folding region NFA2.

Figure 2:
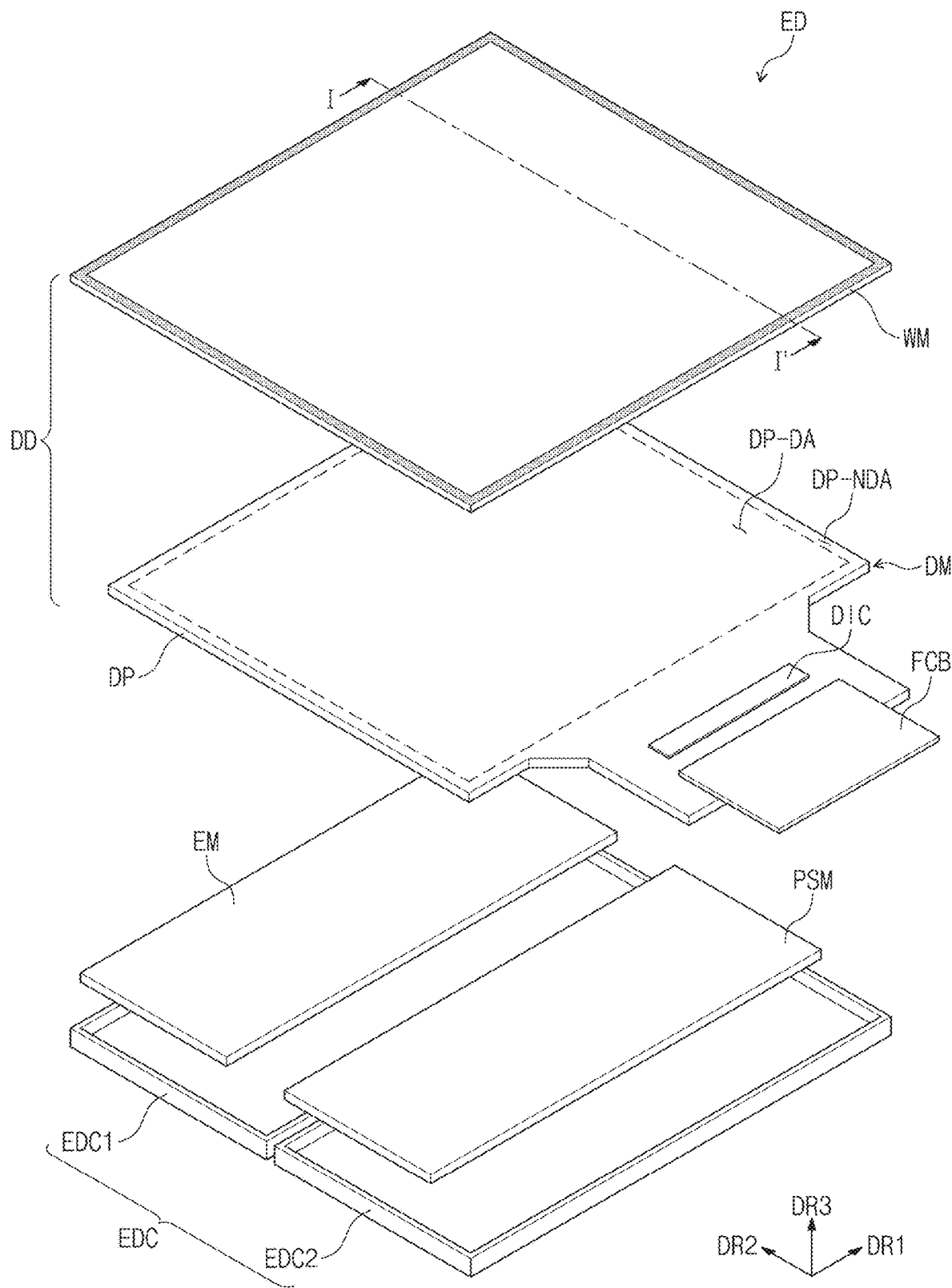
FIG. 2 is an exploded perspective view of an embodiment of an electronic device according to the invention.

FIG. 2 is an exploded perspective view of an embodiment of the electronic device ED according to the invention.

As illustrated in FIG. 2, the electronic device ED may include a display device DD, an electronic module EM, a power module PSM, and the case EDC. Although not separately illustrated, the power module PSM may further include an instrument structure for controlling the folding operation of the display device DD.

The display device DD generates an image and senses an external input. The display device DD includes a window module WM and a display module DM. The window module WM provides a front surface of the electronic device ED.

The display module DM may include at least the display panel DP. FIG. 2 illustrates only the display panel DP among laminated structures of the display module DM, but substantially, the display module DM may further include a plurality of components disposed on upper and lower sides of the display panel DP. The laminate structure of the display module DM will be described in detail later.

The display panel DP includes an active region DP-DA and a peripheral region DP-NDA respectively corresponding to the display region DA (refer to FIG. 1A) and the non-display region NDA (refer to FIG. 1A). In the invention, when "a region/portion corresponds to a region/portion," it means that the region/portion overlaps the region/portion, and the regions/portions are not limited to having the same area. The display module DM may include a driving chip DIC disposed on the peripheral region DP-NDA. The display module DM may further include a flexible circuit film FCB coupled to the peripheral region DP-NDA. Although not illustrated, the flexible circuit film FCB may be connected to a main circuit board.

The driving chip DIC may include driving elements for driving pixels of the display panel DP, for example, a data driving circuit. FIG. 2 illustrates a structure in which the driving chip DIC is disposed (e.g., mounted) on the display panel DP, but the invention is not limited thereto. In an embodiment, the driving chip DIC may be disposed (e.g., mounted) on the flexible circuit film FCB, for example.

The electronic module EM includes at least a main controller. The electronic module EM may include a wireless communication module, a camera module, a proximity sensor module, an image input module, a sound input module, a sound output module, a memory, an external interface module, or the like. The modules may be disposed (e.g., mounted) on a circuit board, or may be electrically connected thereto though a flexible circuit board. The electronic module EM is electrically connected to the power module PSM.

The main controller controls the overall operation of the electronic device ED. In an embodiment, the main controller activates, or deactivates the display device DD in accordance with a user input, for example. The main controller may control the operation of the display device DD and other modules. The main controller may include at least one microprocessor.

The case EDC receives the display module DM, the electronic module EM, and the power module PSM. The case EDC is illustrated as including two cases EDC1 and EDC2 separated from each other, but the invention is not limited thereto. Although not illustrated, the electronic device ED may further include a hinge structure for connecting the two cases EDC1 and EDC2. The case EDC may be coupled to the window module WM. The case EDC protects components received in the case EDC, such as the display module DM, the electronic module EM, and the power module PSM.

Figure 3:
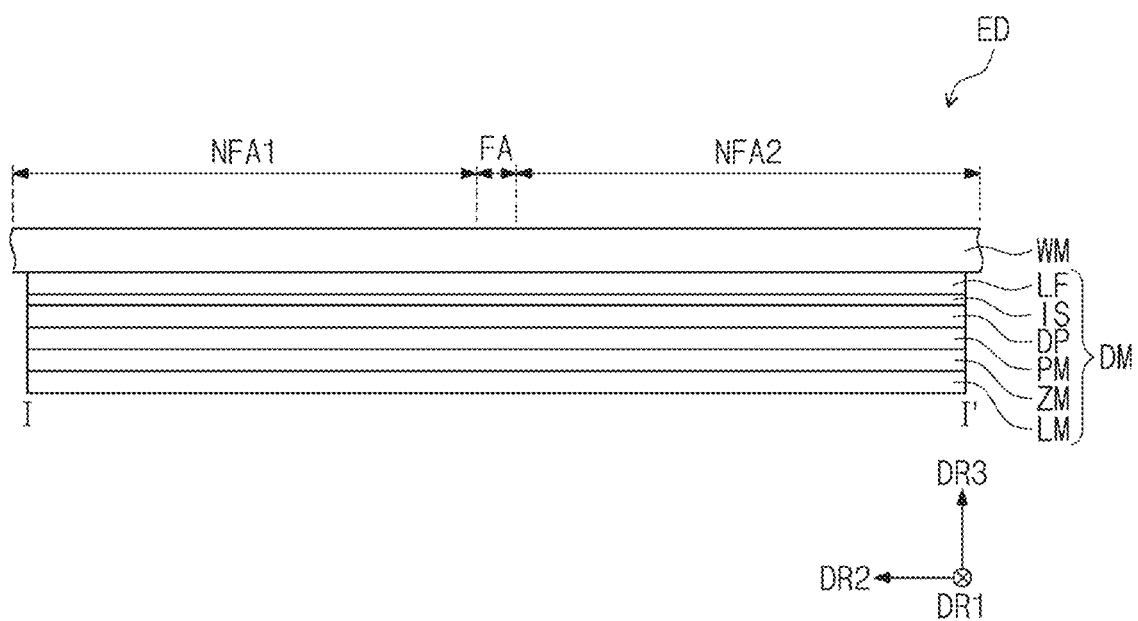
FIG. 3 is a cross-sectional view of an embodiment of an electronic device according to the invention.

FIG. 3 is a cross-sectional view of an embodiment of the electronic device ED according to the invention.

FIG. 3 is a cross-sectional view taken along line I-I' illustrated in FIG. 2.

Referring to FIG. 3, the electronic device ED may include the window module WM and the display module DM disposed below the window module WM.

The window module WM may include a window base layer and a window protection layer. The window base layer may include a thin film glass substrate or a plastic film. In an embodiment, the thickness of the thin film glass substrate may be about 15 micrometers (μm) to about 45 μm. The thin film glass substrate may be chemically tempered glass. The thin film glass substrate may minimize the occurrence of wrinkles even when folding and unfolding are repeated.

In an embodiment, the thickness of the plastic film may be about 50 μm to about 80 μm. In an embodiment, the plastic film may include polyimide, polycarbonate, poly amide, triacetylcellulose, polymethylmethacrylate, or polyethylene terephthalate.

The window protection layer may be a layer for improving impact resistance properties of the window module WM, and preventing scattering when the window module WM is damaged. In an embodiment, the window protection layer may include at least one of a urethane-based resin, an epoxy-based resin, a polyester-based resin, a polyether-based resin, an acrylate-based resin, an acrylonitrile-butadiene-styrene resin, and rubber. In an embodiment of the invention, the window protection layer may include at least one of phenylene, polyethyleneterephthalate ("PET"), polyimide ("PI"), polyamide ("PAI"), polyethylene naphthalate ("PEN"), or polycarbonate ("PC"). On an upper surface of the window protection layer, at least one of a hard coating layer, a fingerprint prevention layer, or a reflection prevention layer may be disposed.

An adhesive layer may be disposed between the window base layer and the window protection layer, when desired. The adhesive layer may be a pressure sensitive adhesive ("PSA") film or an optically clear adhesive ("OCA") member. The same description may be applied to an adhesive layer to be described below.

The display module DM may include the display panel DP, an input sensor IS disposed on the display panel DP, an optical film LF disposed on the input sensor IS, a digitizer ZM disposed below the display panel DP, a protection member PM disposed between the display panel DP and the digitizer ZM, and a lower member LM disposed below the digitizer ZM. An adhesive layer may be disposed between the members, when desired.

The display panel DP may include a base layer, a circuit element layer disposed on the base layer, a display element layer disposed on the circuit element layer, and a thin film encapsulation layer disposed on the display element layer. The base layer may include a plastic film. In an embodiment, the base layer may include polyimide, for example. Substantially, the planar shape of the base layer is the same as the planar shape of the display panel DP illustrated in FIG. 4.

The circuit element layer may include an organic layer, an inorganic layer, a semiconductor pattern, a conductive pattern, a signal line, or the like. The organic layer, the inorganic layer, the semiconductor layer, and the conductive layer may be formed or disposed on the base layer by coating, deposition, or the like. Thereafter, the organic layer, the inorganic layer, the semiconductor layer, and the conductive layer may be selectively patterned through performing a photolithography process a plurality of times to form a semiconductor pattern, a conductive pattern, and a signal line.

The semiconductor pattern, the conductive pattern, and the signal line may form a pixel driving circuit and signal lines SL1 to SLm, DL1 to DLn, EL1 to ELm, CSL1, CSL2, and PL of pixels PX illustrated in FIG. 4 to be described later. The pixel driving circuit may include at least one transistor.

The display element layer includes a light emission element of the pixels PX illustrated in FIG. 4 to be described later. The light-emitting element is electrically connected to the at least one transistor. The thin film encapsulation layer may be disposed on the circuit element layer to encapsulate the display element layer. The thin film encapsulation layer may include an inorganic layer, an organic layer, and an inorganic layer sequentially laminated. The laminate structure of the thin film encapsulation layer is not particularly limited.

The input sensor IS may include a plurality of sensing electrodes (now shown) for sensing an external input, trace lines (now shown) connected to the plurality of sensing electrodes, and an inorganic layer and/or an organic layer for insulating/protecting the plurality of sensing electrodes or the trace lines. The input sensor IS may be a capacitive sensor, but is not particularly limited thereto.

The input sensor IS may be directly formed on the thin film encapsulation layer through a continuous process, when manufacturing the display panel DP. However, the invention is not limited thereto, and the input sensor IS may be manufactured as a separate panel from the display panel DP, and be attached to the display panel DP by an adhesive layer.

Figure 4:
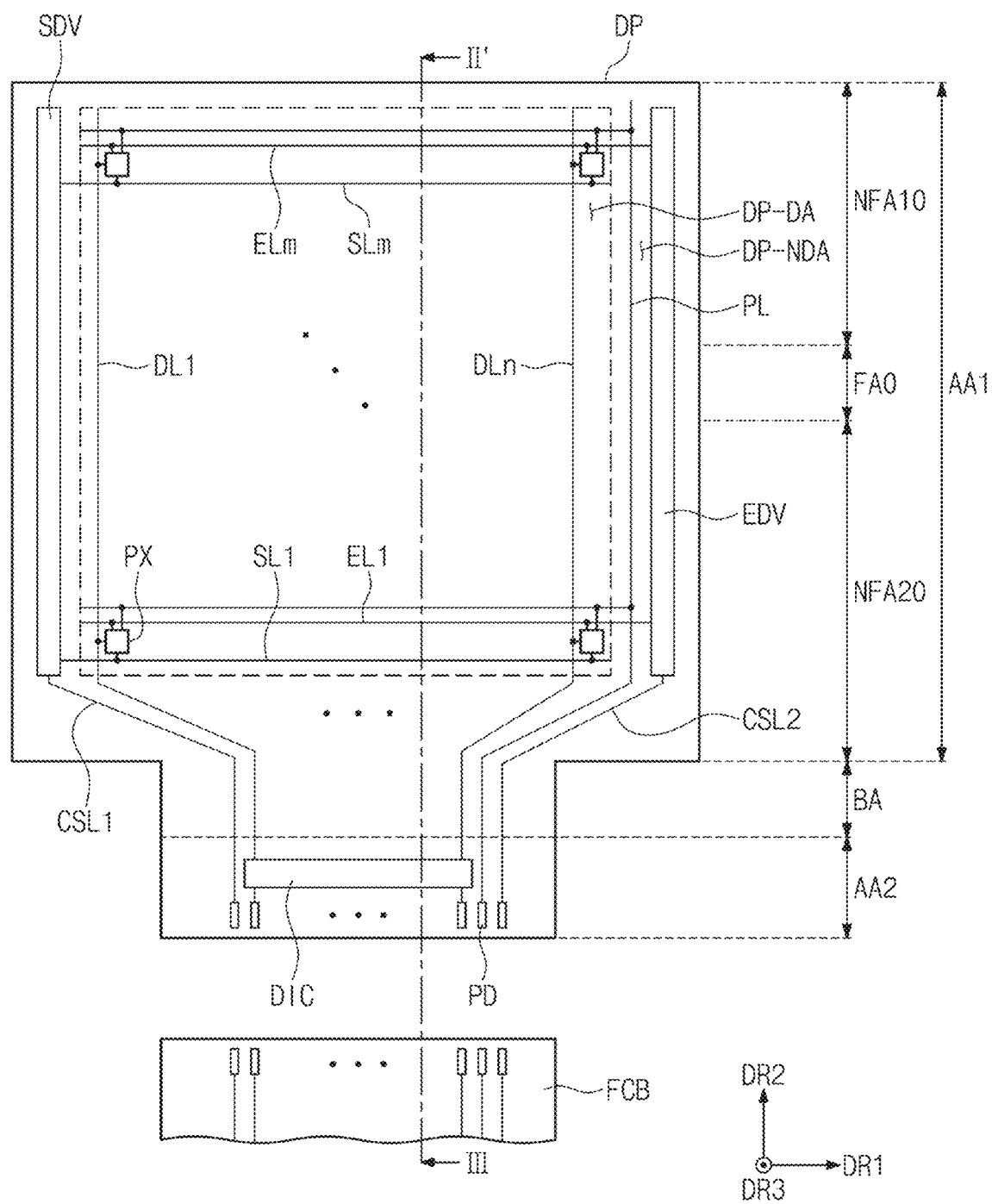
FIG. 4 is a plan view of an embodiment of a display panel according to the invention.

The plurality of sensing electrodes overlap the active region DP-DA (refer to FIG. 4). The trace lines are disposed to overlap the peripheral region DP-NDA. The trace lines may be extended toward a lower end of a second region AA2 via a bending region BA (refer to FIG. 4) so as to be adjacent to a pad PD illustrated in FIG. 4. At this time, the trace lines are disposed in a different layer from the signal lines SL1 to SLm, DL1 to DLn, EL1 to ELm, CSL1, CSL2, and PL of the circuit element layer.

The trace lines may be connected to signal lines (input signal lines) provided for the input sensor IS of the display panel DP in a first region AA1 illustrated in FIG. 4. The input signal lines are different signal lines from the signal lines SL1 to SLm, DL1 to DLn, EL1 to ELm, CSL1, CSL2, and PL illustrated in FIG. 4, but may be disposed in the same layer as any one thereof. Each of the input signal lines may be connected to a corresponding pad PD. As a result, the trace lines may be electrically connected to the same flexible circuit film FCB as the signal lines of the circuit element layer.

The optical film LF may lower an external light reflectance rate. The optical film LF may include a phase retarder and/or a polarizer. The optical film LF may include at least a polarizing film. In an alternative embodiment, the optical film LF may be omitted, and may be, for example, replaced with an optical structure in the display panel DP.

The protection member PM may be disposed below the display panel DP and support the display panel DP or adsorb an external impact. The laminate structure of the protection member PM will be described in detail later.

The digitizer ZM may be disposed below the display panel DP. The digitizer ZM may sense the position or intensity of the electromagnetic pen SP input to the electronic device ED. The digitizer ZM may be driven in an electro-magnetic resonance ("EMR") manner. The EMR manner is a manner in which when a magnetic field is generated in a resonant circuit inside the electromagnetic pen SP, the magnetic field incurs a magnetic field in a plurality of coils included in the digitizer ZM, and the generated magnetic field is again applied to the resonant circuit inside the electromagnetic pen SP to emit a magnetic field of a resonant frequency in the electromagnetic pen SP. The digitizer ZM may detect the position of the electromagnetic pen SP through the magnetic field of the resonant frequency.

However, this is only illustrative. The digitizer ZM may be designed in various driving manners as long as it may sense an input of the electromagnetic pen SP, but is not limited to any particular embodiment.

The lower member LM may be disposed below the digitizer ZM. The lower member LM may include various functional members. The lower member LM may include a light-blocking layer which blocks light incident on the display panel DP, an impact absorbing layer which absorbs an external impact, a support layer which supports the display panel DP, a heat dissipating layer which dissipates heat generated in the display panel DP, an electromagnetic shielding layer which blocks an electromagnetic wave which affects the digitizer ZM. The laminate structure of the lower member LM will be described in detail later.

FIG. 4 is a plan view of an embodiment of the display panel DP according to the invention.

Referring to FIG. 4, the display panel DP may include the active region DP-DA and the peripheral region DP-NDA adjacent to the active region DP-DA. The active region DP-DA and the peripheral region DP-NDA are distinguished by the presence of the pixel PX. The pixel PX is disposed in the active region DP-DA. A scan driver SDV, a data driver, and a light emission driver EDV may be disposed in the peripheral region DP-NDA. The data driver may be at least one circuits configured in the driving chip DIC illustrated in FIG. 4.

The display panel DP may include the first region AA1, the second region AA2, and a bending region BA distinguished in the second direction DR2. The second region AA2 and the bending region BA may be at least partial regions of the peripheral region DP-NDA. The bending region BA may be disposed between the first region AA1 and the second region AA2.

FIG. 4 illustrates a state in which the display panel DP is unfolded before being bent. Assuming that the display panel DP is installed in the electronic device ED, when the electronic device ED is unfolded as shown in FIG. 1A, the bending region BA is bent such that the first region AA1 and the second region AA2 of the display panel DP face each other.

Referring back to FIG. 4, the first region AA1 is a region corresponding to the display surface DS of FIG. 1A. The first region AA1 may include a first non-folding region NFA10, a second non-folding region NFA20, and a folding region FAO. The first non-folding region NFA10, the second non-folding region NFA20, and the folding region FAO respectively correspond to the first non-folding region NFA1, the second non-folding region NFA2, and the folding region FA of FIG. 1A to FIG. 1C.

In the first direction DR1, the length of the bending region BA and the length of the second region AA2 may be smaller than the length of the first region AA1. A region having a shorter length in a bending axis direction may be more easily bent.

The display panel DP may include a plurality of pixels PX, a plurality of scan lines SL1 to SLm, a plurality of data lines DL1 to DLn, a plurality of light emission lines EL1 to ELm, first and second control lines CSL1 and CSL2, a power line PL, and a plurality of pads PD. Here, m and n are natural numbers. The pixels PX may be connected to the scan lines SL1 to SLm, the data lines DL1 to DLn, and the light emission lines EL1 to ELm.

The scan lines SL1 to SLm may be extended in the first direction DR1 and connected to the scan driver SDV. The data lines DL1 to DLn are extended in the second direction DR2, and may be connected to the driving chip DIC via the bending region BA. The light emission lines EL1 to ELm may be extended in the first direction DR1 and connected to the light emission driver EDV.

The power line PL may include a portion extended in the second direction DR2 and a portion extended in the first direction DR1. The portion extended in the first direction DR1 and the portion extended in the second direction DR2 may be disposed in different layers. The portion of the power line PL extended in the second direction DR2 may be extended to the second region AA2 via the bending region BA. The power line PL may provide a first voltage to the pixels PX.

The first control line CSL1 is connected to the scan driver SDV, and may be extended toward a lower end of the second region AA2 via the bending region BA. The second control line CSL2 is connected to the light emission driver EDV, and may be extended toward the lower end of the second region AA2 via the bending region BA.

When viewed in a plan view, the pads PD may be disposed adjacent to the lower end of the second region AA2. The driving chip DIC, the power line PL, the first control line CSL1, and the second control line CSL2 may be connected to the pads PD. The flexible circuit film FCB may be electrically connected to the pads PD through an anisotropic conductive adhesive layer.

Figure 5:
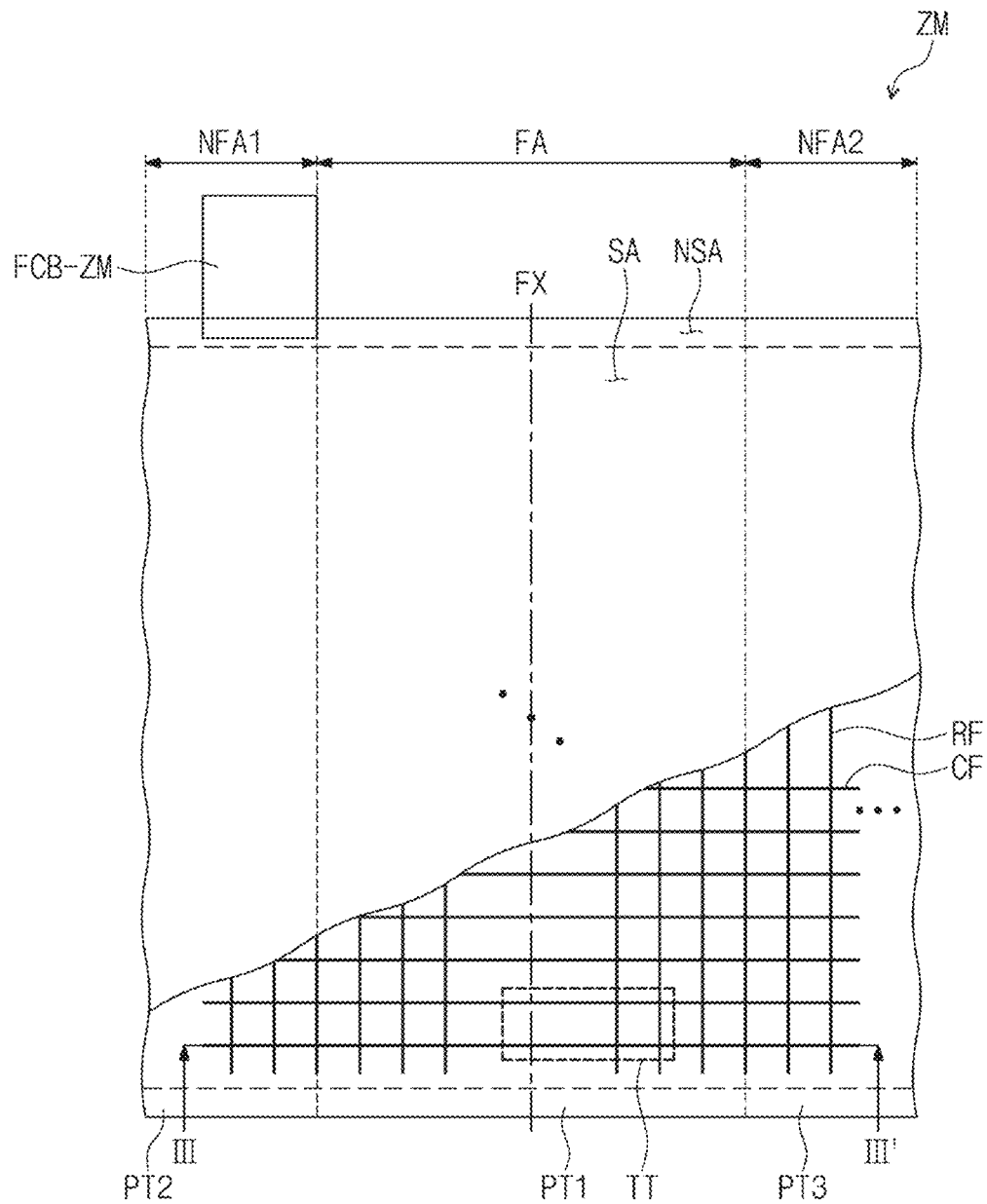
FIG. 5 is a plan view of an embodiment of a digitizer according to the invention.
Figure 5:
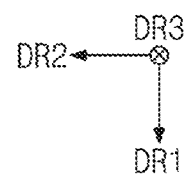

FIG. 5 a plan view of an embodiment of the digitizer ZM according to the invention.

Referring to FIG. 5, the digitizer ZM of an embodiment includes a plurality of closed curves. The digitizer ZM may recognize an input of the electromagnetic pen SP, and detect the position of the electromagnetic pen SP in an electromagnetic resonance ("EMR") manner by including a closed curve. Here, the closed curve may consist of straight lines, a curved line, or a combination of a straight line and a curved line as long as a start of a line meets an end of the line.

Specifically, the digitizer ZM includes first conductive lines CF and second conductive lines RF. The first conductive lines CF and the second conductive lines RF may be disposed in different layers from each other. In order for the digitizer ZM to be operated, at least one of the first conductive lines CF and at least one of the second conductive lines RF are electrically connected to form the plurality of closed curves.

The digitizer ZM may include a sensing region SA and a non-sensing region NSA. The first conductive lines CF and the second conductive lines RF may be disposed in the sensing region SA. The non-sensing region NSA is a region adjacent to the sensing region SA, and in an embodiment, the non-sensing region NSA may surround the sensing region SA. A flexible circuit film FCB-ZM may be disposed in the non-sensing region NSA. In an embodiment, it is illustrated that one flexible circuit film FCB-ZM is disposed in a second portion PT2 overlapping the non-sensing region NSA. However, the invention is not limited thereto. Two or more flexible circuit films FCB-ZM may be disposed, and may be disposed in a third portion PT3 overlapping the non-sensing region NSA. The first conductive lines CF and the second conductive lines RF may be connected to the flexible circuit film FCB-ZM through signal lines (not shown).

In the sensing region SA of an embodiment, each of the first conductive lines CF may be extended along the second direction DR2, and may be spaced apart from each other in the first direction DR1. In the invention, the second direction DR2 may be understood as a first direction.

Each of the second conductive lines RF may be extended along the first direction DR1, and may be spaced apart from each other in the second direction DR2. In the invention, the first direction DR1 may be understood as a y-axis direction. In an embodiment, the second conductive lines RF may be spaced apart from the folding axis FX by a predetermined distance.

At a point at which the first conductive lines CF and the second conductive lines RF overlap, via-holes VH may be defined when desired. Specifically, at least one of the first conductive lines CF and at least one of the second conductive lines RF may be electrically connected through the via-holes VH to form closed curves. The structure of the via-holes VH will be described in detail later.

The digitizer ZM of an embodiment may include a first portion PT1, a second portion PT2, and a third portion PT3 distinguished from each other in the second direction DR2. The first portion PT1 corresponds to the folding region FA of the electronic device ED (refer to FIG. 3), the second portion PT2 corresponds to the first non-folding region NFA1 of the electronic device ED (refer to FIG. 3), and the third portion PT3 corresponds to the second non-folding region NFA2 of the electronic device ED (refer to FIG. 3). That is, when the electronic device ED is folded, the first portion PT1 of the digitizer ZM may be a portion folded along the folding axis FX. Hereinafter, it may be understood that the folding region of the digitizer ZM is the first portion PT1, the first non-folding region of the digitizer ZM is the second portion PT2, and the second non-folding region of the digitizer ZM is the third portion PT3. The folding axis FX may be defined on an upper surface or a back surface of the digitizer ZM.

Figure 6:
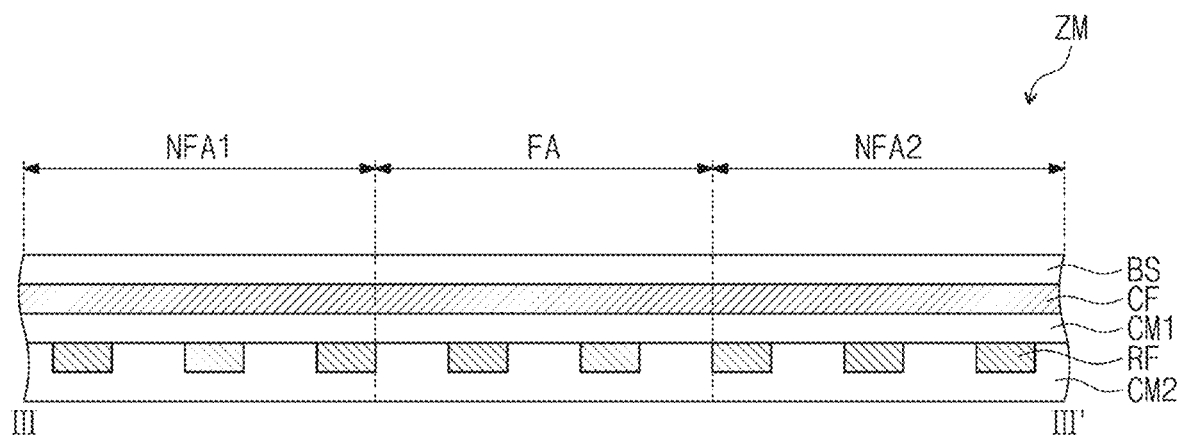
FIG. 6 is a cross-sectional view of an embodiment of a digitizer according to the invention.
Figure 6:
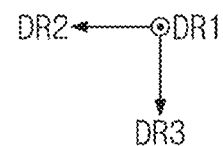

FIG. 6 is a cross-sectional view of an embodiment of the digitizer ZM according to the invention.

FIG. 6 is a cross-sectional view taken along line III-III' illustrated in FIG. 5.

Referring to FIG. 6, based on a direction opposite to the third direction DR3, the digitizer ZM of an embodiment may include a base layer BS, the first conductive lines CF disposed on the base layer BS, a first cover layer CM1 disposed on the first conductive lines CF, the second conductive lines RF disposed on the first cover layer CM1, and a second cover layer CM2 disposed on the second conductive lines RF. This may be the same as the order in which each component is laminated in a process of manufacturing the digitizer ZM.

The base layer BS may include an organic material. In an embodiment, the base layer BS may include at least one of polyimide, polycarbonate, or polyamide, and may specifically, include polyimide, for example.

The first cover layer CM1 and the second cover layer CM2 may be insulation layers.

The first cover layer CM1 may be disposed on the base layer BS and cover the first conductive lines CF. The first cover layer CM1 according to the invention may include a material which is relatively more flexible than the base layer BS. In an embodiment, the first cover layer CM1 may include an elastic rubber including a synthetic rubber and a cross-linking component, for example. Specifically, the first cover layer CM1 may include at least one among butadiene rubber, styrene-butadiene rubber, and butyl rubber as the synthetic rubber.

The second cover layer CM2 may be disposed on the first cover layer CM1 and cover the second conductive lines RF. The second cover layer CM2 may include the same material as that of the first cover layer CM1, or may include a material having a lower modulus than that of the first cover layer CM1.

However, the laminate structure of the digitizer ZM is not limited thereto.

Figure 7:
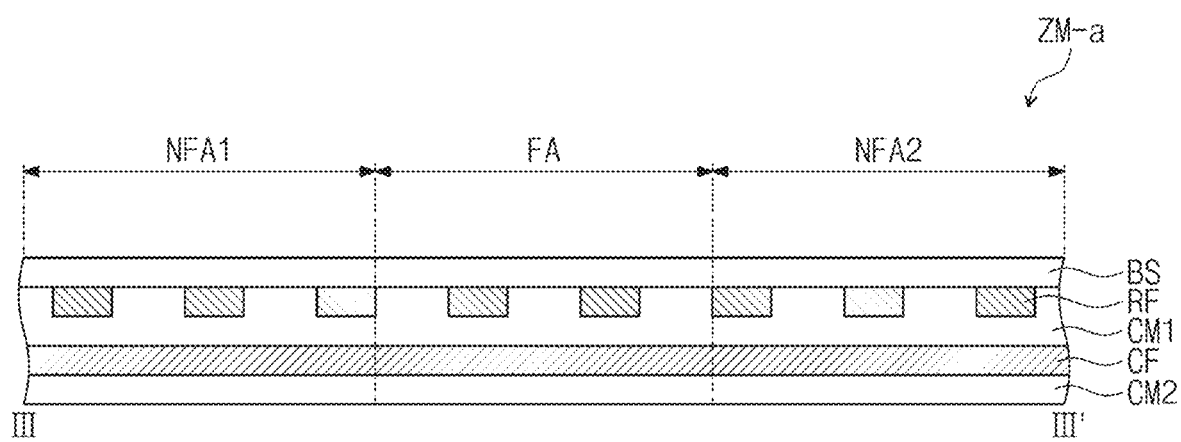
FIG. 7 is a cross-sectional view of an embodiment of a digitizer according to the invention.
Figure 7:
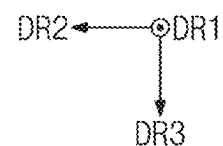

FIG. 7 is a cross-sectional view of an embodiment of a digitizer ZM-a according to the invention.

FIG. 7 is a cross-sectional view taken along line III-III' illustrated in FIG. 5.

Referring to FIG. 7, a digitizer ZM-a of an embodiment may include a base layer BS, second conductive lines RF disposed on the base layer BS, a first cover layer CM1 for covering the second conductive lines RF, first conductive lines CF disposed on the first cover layer CM1, and a second cover layer CM2 for covering the first conductive lines CF.

Hereinafter, a description will be given with respect to the digitizer ZM described with reference to FIG. 6.

FIG. 8A to FIG. 8E are plan views of an embodiment in which region TT illustrated in FIG. 5 is enlarged. That is, FIG. 8A to FIG. 8E shows an enlarged portion of the first portion PT1 of the digitizer ZM (refer to FIG. 5).

Figure 8A:
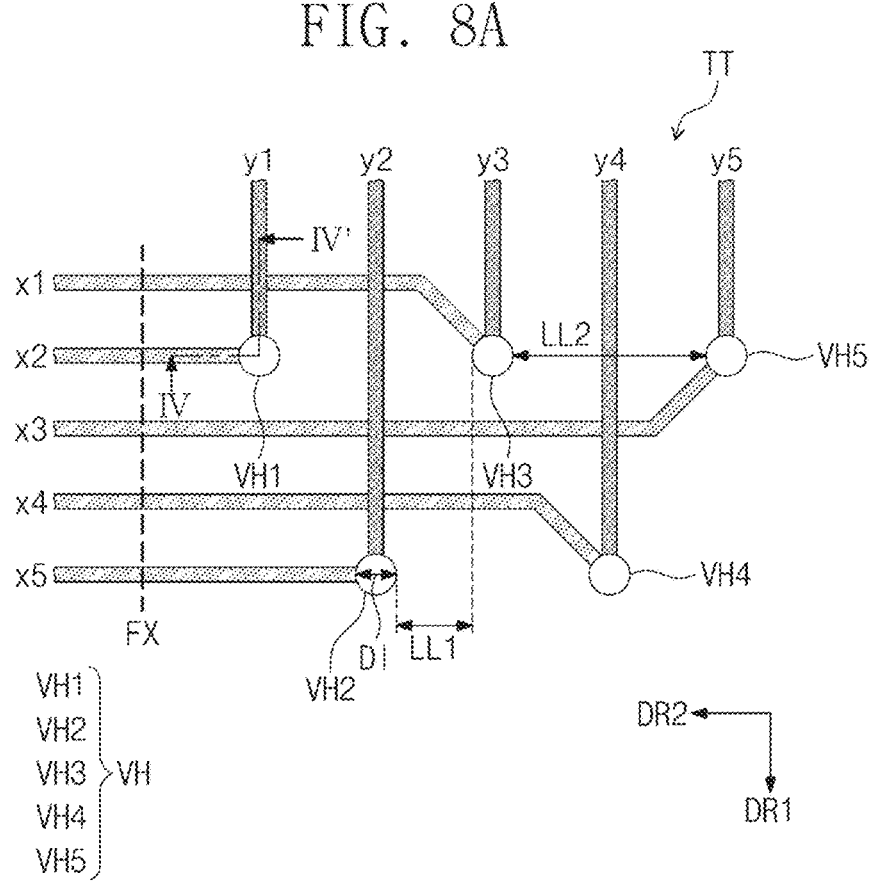
FIG. 8A to FIG. 8E are plan views of an embodiment in which region TT illustrated in FIG. 5 is enlarged.

Referring to FIG. 8A, the via-holes VH may be defined in the digitizer ZM of an embodiment. In an embodiment, the via-holes VH overlaps the folding region FA (refer to FIG. 5), and may be adjacent to the folding axis FX.

The digitizer ZM may form closed curves by connecting at least one of the first conductive lines CF (refer to FIG. 5) extended in the second direction DR2 and at least one of the second conductive lines RF (refer to FIG. 5) extended in the first direction DR1. The first conductive lines CF (refer to FIG. 5) and the second conductive lines RF (refer to FIG. 5) disposed in different layers may be connected to each other at a predetermined portion by a via-hole VH, when desired.

In FIG. 8A, in an embodiment of the first conductive lines CF (refer to FIG. 5), a first row line x1, a second row line x2, a third row line x3, a fourth row line x4, and a fifth row line x5 are illustrated. The first to fifth row lines x1, x2, x3, x4, and x5 are spaced apart from each other on the first direction DR1. Each of the first to fifth row lines x1, x2, x3, x4, and x5 is extended in the second direction DR2.

In an embodiment of the second conductive lines RF, a first column line y1, a second column line y2, a third column line y3, a fourth column line y4, and a fifth column line y5 are illustrated. The first to fifth column lines y1, y2, y3, y4, and y5 are spaced apart from each other on the second direction DR2. Each of the first to fifth column lines y1, y2, y3, y4, and y5 is extended in the first direction DR1.

The via-holes VH may include a first via-hole VH1, a second via-hole VH2, a third via-hole VH3, a fourth via-hole VH4, and a fifth via-hole VH5. In FIG. 8A to FIG. 8F, In an embodiment, the via-holes VH are illustrated as having a circular shape, but the shape of the via-holes VH is not limited thereto. The shape of the via-holes VH may be elliptical or polygonal, or the via-holes VH may have a shape in which at least one thereof includes a curved line, or at least one thereof includes a straight line.

In FIG. 8A to FIG. 8F, the average size of the via-holes VH may correspond to a diameter DI (hereinafter, a first diameter) of the first to fifth via-holes VH1, VH2, VH3, VH4, and VH5. In an embodiment, the diameters of the first to fifth via-holes VH1, VH2, VH3, VH4, and VH5 may be substantially the same as each other. In the invention, terms "substantially the same" or the like should be understood as being the same including general errors such as process errors.

Hereinafter, an average size value of the via-holes VH is described as the first diameter DI. However, the invention is not limited thereto. When the shape of the via-holes VH is changed in another embodiment, the description for the first diameter DI may be equally applied to a changed average size value of the via-holes VH.

Each of the first to fifth via-holes VH1, VH2, VH3, VH4, and VH5 may electrically connect any corresponding one among the first to fifth row lines x1, x2, x3, x4, and x5 and any corresponding one among the first to fifth column lines y1, y2, y3, y4, and y5. In an embodiment, the first via-hole VH1 may electrically connect the first row line x1 and the first column line y1, for example.

As the first conductive lines CF extended in the second direction DR2 and the second conductive lines RF extended in the first direction DR1 are electrically connected at a predetermined point by a via-hole VH, the digitizer ZM (refer to FIG. 5) may include a plurality of closed curves.

In an embodiment of the invention, a gap between any two neighboring via-holes among the via-holes VH may be greater than or equal to the average size of the via-holes VH, and may be, for example, greater than or equal to the first diameter DI.

Specifically, a first length LL1, which is a horizontal distance between the second via-hole VH2 and the third via-hole VH3, may be greater than the first diameter DI. However, this is only illustrative. The first length LL1 may be the same as the first diameter DI.

In an embodiment of the invention, the number of via-holes VH defined in the same column among the via-holes VH may be less than or equal to two. In an embodiment, as illustrated in FIG. 8A, each of the first to fifth via-holes VH1, VH2, VH3, VH4, and VH5 may be arranged in different columns from each other, for example.

In an embodiment of the invention, when n via-holes VH are defined in the same row, a horizontal distance between any two neighboring via-holes among the n via-holes VH is n times the average size of the via-holes VH. n is an integer greater than or equal to two. In an embodiment, the first via-hole VH1, the third via-hole VH3, and the fifth via-hole VH5 may be defined in a first via-hole row, and the second via-hole VH2 and the fourth via-hole VH4 may be defined in a second via-hole row, for example. The first via-hole row may be a row parallel to the second row line x2, and the second via-hole row may be a row parallel to the fifth row line x5.

In an embodiment, a second length LL2, which is a horizontal distance between the third via-hole VH3 and the fifth via-hole VH5 among the via-holes VH defined in the first via-hole row, may be three times the first diameter DI.

A conductive material may be further disposed in the via-holes VH to connect the first conductive line CF (refer to FIG. 5) and the second conductive line RF (refer to FIG. 5). The conductive material may be the same material as that of the first conductive line CF (refer to FIG. 5) or the second conductive line RF (refer to FIG. 5), or may be a conductive material known in the art. Since the conductive material instead of an insulation material is disposed in the via-holes VH, the rigidity of a portion overlapping the via-holes VH may be greater than that of a portion in which the via-holes VH are not defined.

The via-holes VH is defined in the digitizer ZM (refer to FIG. 5) in the first portion PT1, where a gap between the via-holes VH is greater than or equal to the first diameter DI, and includes less than or equal to two via-holes VH in one column. When n via-holes VH are defined in one row, a distance between any two neighboring via-holes among the n via-holes VH is n times the first diameter DI. Accordingly, rigidity may be uniform in the entire first portion PT1. The electronic device ED of the invention may prevent a problem of the occurrence of damage, such as cracks, due to the non-uniform rigidity in the first portion PT1 of the digitizer ZM during a folding operation.

However, the disposition of the via-hole VH of the invention is not limited thereto.

Figure 8B:
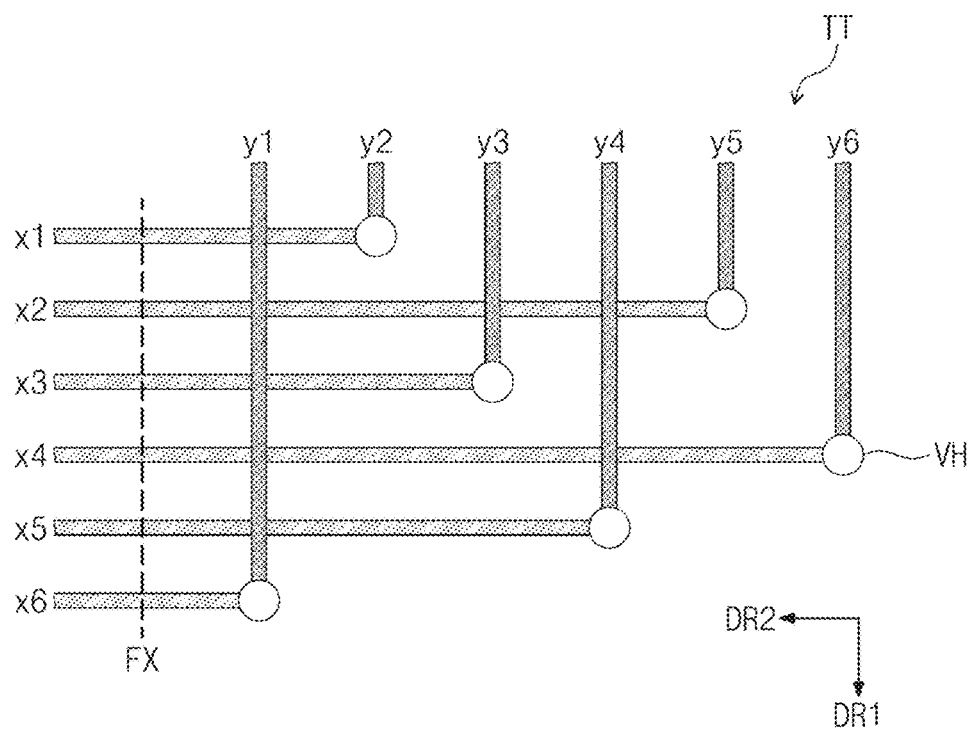

Referring to FIG. 8B, the via-holes VH of an embodiment may be defined in different rows from each other, and may be defined in different columns from each other.

In FIG. 8B, in an embodiment of the first conductive lines CF (refer to FIG. 5), the first row line x1, the second row line x2, the third row line x3, the fourth row line x4, the fifth row line x5, and a sixth row line x6 are illustrated. The first to sixth row lines x1, x2, x3, x4, x5, and x6 are spaced apart from each other on the first direction DR1. Each of the first to sixth row lines x1, x2, x3, x4, x5, and x6 is extended in the second direction DR2.

In an embodiment of the second conductive lines RF, the first column line y1, the second column line y2, the third column line y3, the fourth column line y4, the fifth column line y5, and a sixth column line y6 are illustrated. The first to sixth column lines y1, y2, y3, y4, y5, and y6 are spaced apart from each other on the second direction DR2. Each of the first to sixth column lines y1, y2, y3, y4, y5, and y6 is extended in the first direction DR1.

Referring to FIG. 8B, each of the via-holes VH of an embodiment may electrically connect any corresponding one among the first to sixth row lines x1, x2, x3, x4, x5, and x6 and any corresponding one among the first to sixth column lines y1, y2, y3, y4, y5, and y6. Specifically, rows in which the via-holes VH are defined may be different from each other. In an embodiment, the six via-holes VH may be respectively defined in the first to sixth row lines x1, x2, x3, x4, x5, and x6, for example. In addition, columns in which the via-holes VH are an embodiment of may be different from each other. In an embodiment, the six via-holes VH may be respectively defined in the first to sixth column lines y1, y2, y3, y4, y5, and y6, for example.

The via-holes VH may be defined in the digitizer ZM (refer to FIG. 5) in the first portion PT1, where the via-holes VH are defined in different rows, and simultaneously in different columns, so that the rigidity of the first portion PT1 may be uniformly maintained. Therefore, when folding the electronic device ED, a problem of the occurrence of damage, such as cracks, due to the non-uniform rigidity in the first portion PT1 of the digitizer ZM may be prevented.

Figure 8C:
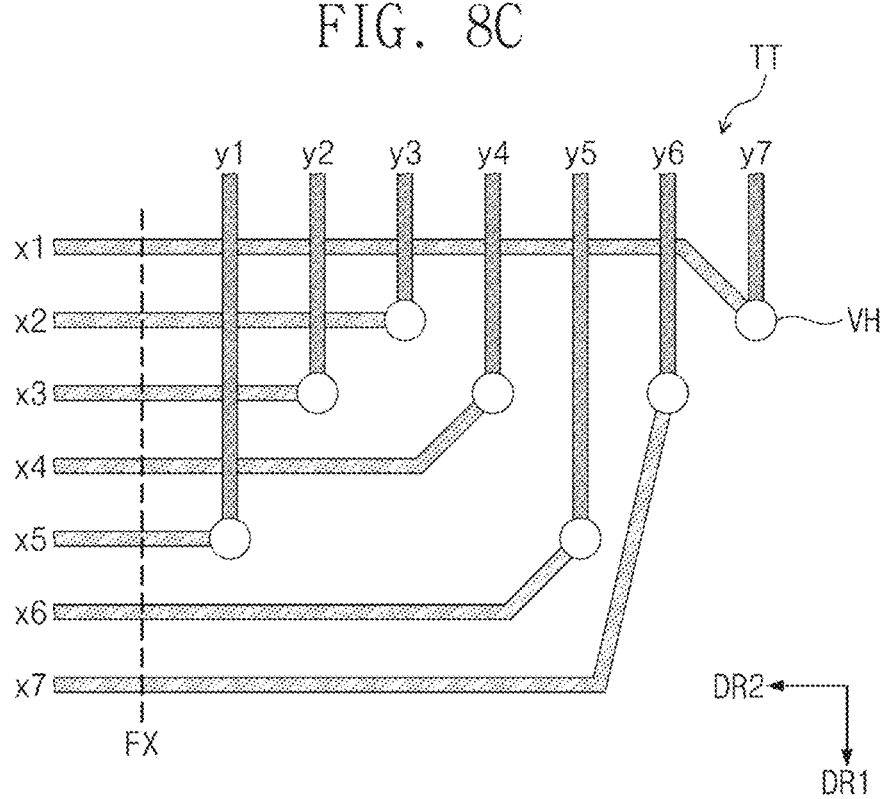

Referring to FIG. 8C, the via-holes VH of an embodiment may be defined in a zig-zag shape in a plan view. In an alternative embodiment, referring to FIG. 8D, the via-holes VH of an embodiment may be defined in a diagonal shape in a plan view.

Figure 8D:
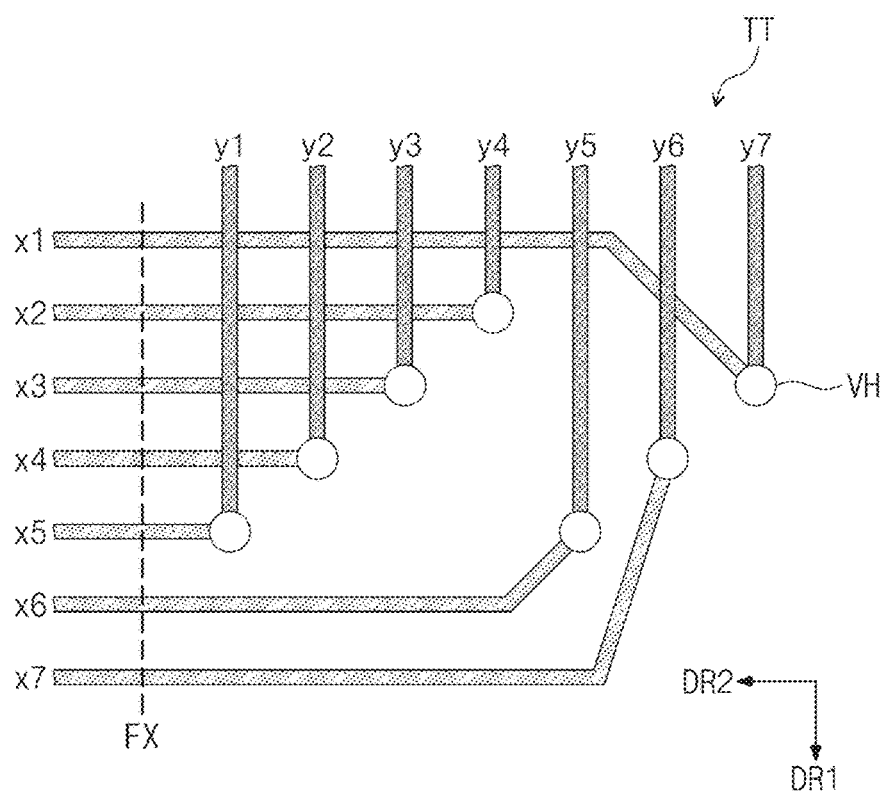

In FIG. 8C and FIG. 8D, in an embodiment of the first conductive lines CF (refer to FIG. 5), the first row line x1, the second row line x2, the third row line x3, the fourth row line x4, the fifth row line x5, the sixth row line x6, and a seventh row line x7 are illustrated. The first to seventh row lines x1, x2, x3, x4, x5, x6, and x7 are spaced apart from each other on the first direction DR1. Each of the first to seventh row lines x1, x2, x3, x4, x5, x6, and x7 is extended in the second direction DR2.

In FIG. 8C and FIG. 8D, in an embodiment of the second conductive lines RF (refer to FIG. 5), the first column line y1, the second column line y2, the third column line y3, the fourth column line y4, the fifth column line y5, the sixth column line y6, and a seventh column line y7 are illustrated. The first to seventh column lines y1, y2, y3, y4, y5, y6, and y7 are spaced apart from each other on the second direction DR2. Each of the first to seventh column lines y1, y2, y3, y4, y5, y6, and y7 is extended in the first direction DR1.

In each of FIG. 8C and FIG. 8D, each of via-holes VH of an embodiment may electrically connect any corresponding one among the first to seventh row lines x1, x2, x3, x4, x5, x6, and x7 and any corresponding one among the first to seventh column lines y1, y2, y3, y4, y5, y6, and y7.

The description given above with respect to FIG. 8A and FIG. 8B may be equally applied to a spacing gap of the via-holes VH illustrated in FIG. 8C and FIG. 8D.

Figure 8E:
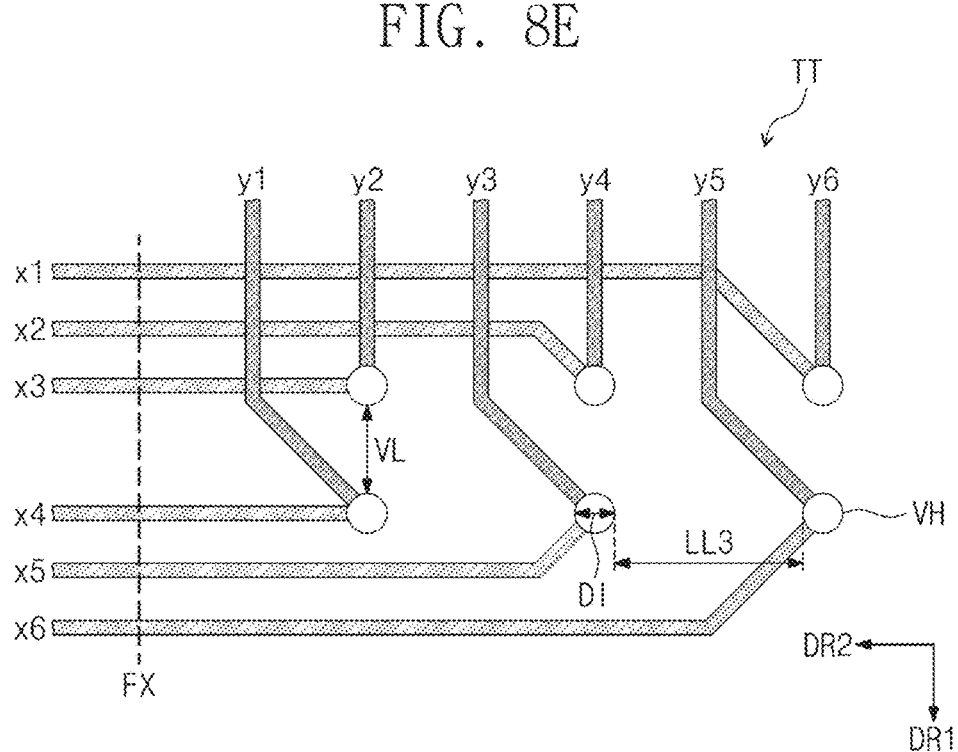

Referring to FIG. 8E, in an embodiment, three via-holes VH may be defined in the first via-hole row, and three via-holes VH may be defined in the second via-hole row. The first via-hole row may be understood as a row parallel to the third row line x3, and the second via-hole row may be understood as a row parallel to the fourth row line x4. In the third row line x3, a third length LL3, which is a horizontal distance between any two neighboring via-holes among the via-holes VH, is two times or more than the first diameter DI.

In an embodiment of the invention, a maximum of two via-holes VH may be defined in the same column.

Specifically, two via-holes VH in a first via-hole column, two via-holes VH in a second via-hole column, and two via-holes VH in a third via-hole column may be defined. It may be understood that the first via-hole column is a column parallel to the second column line y2, the second via-hole column is a column parallel to the fourth column line y4, and the third via-hole column is a column parallel to the sixth column line y6.

A vertical distance VL between two via-holes VH defined in the same column may be two times or more than the first diameter DI.

Accordingly, the digitizer ZM in which the via-holes VH are defined as illustrated in FIG. 8E may exhibit uniform rigidity in the first portion PT1.

Figure 8F:
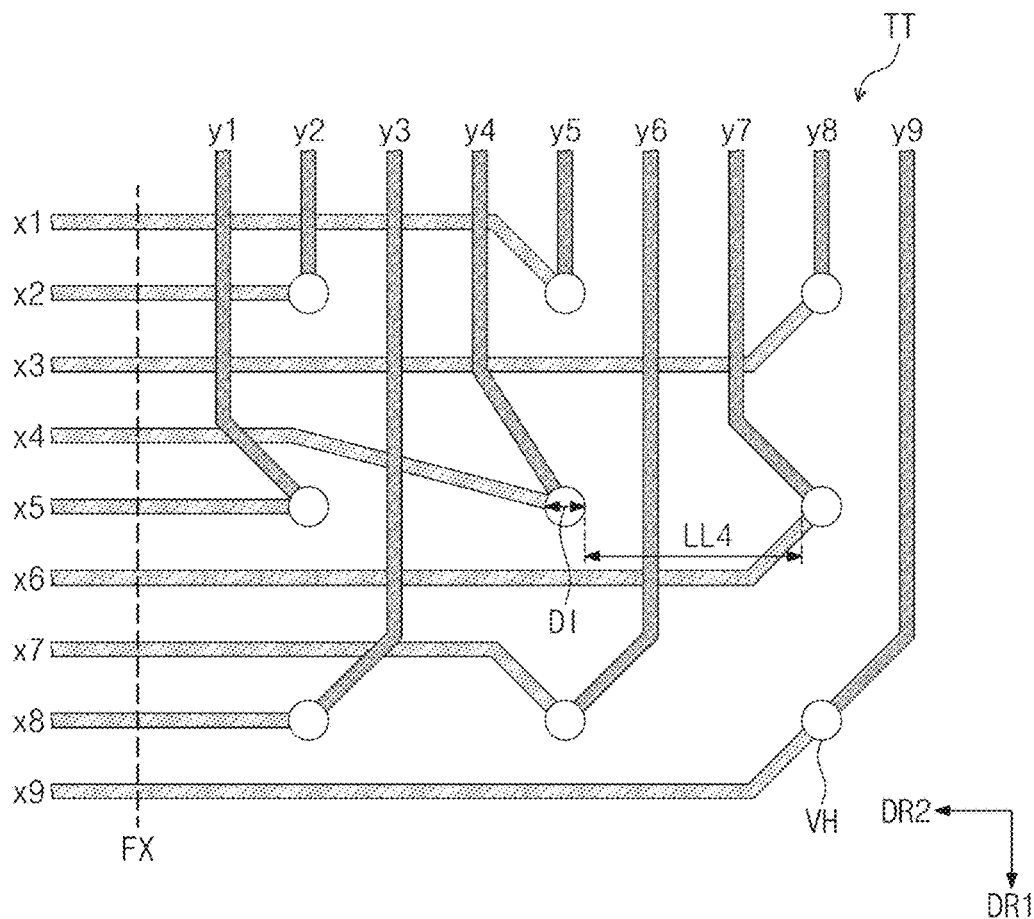
FIG. 8F is a plan view of a comparative embodiment in which region TT illustrated in FIG. 5 is enlarged.

FIG. 8F is a plan view of a comparative embodiment in which region TT illustrated in FIG. 5 is enlarged.

Referring to FIG. 8F, three via-holes VH in the first via-hole row, three via-holes VH in the second via-hole row, and three via-holes VH in a third via-hole row may be defined. It may be understood that the first via-hole row is a row parallel to the second row line x2, the second via-hole row is a row parallel to the fifth row line x5, and the third via-hole row is a row parallel to an eighth row line x8. In the fifth row line x5, a fourth length LL4, which is a horizontal distance between any two neighboring via-holes among the via-holes VH, is three times or more than the first diameter DI.

Three of the via-holes VH of FIG. 8F are defined in the first via-hole column, three thereof in the second via-hole column, and three thereof in the third via-hole column. It may be understood that the first via-hole column is a column parallel to the second column line y2, the second via-hole column is a column parallel to the fifth column line y5, and the third via-hole column is a column parallel to an eighth column line y8.

Unlike the via-holes VH illustrated in FIG. 8A to FIG. 8E, three or more via-holes VH illustrated in FIG. 8F may be defined in one row, so that non-uniform rigidity may appear in the first portion PT1 of the digitizer ZM.

Accordingly, in the case of a digitizer in which the via-holes VH are defined as illustrated in FIG. 8F, when folding an electronic device, damage such as cracks may occur in a first portion of the digitizer.

The via-holes VH are defined in the digitizer ZM (refer to FIG. 5) in the first portion PT1 (refer to FIG. 5), and the via-holes VH may be defined in different rows from each other and different columns from each other. In an alternative embodiment, when n via-holes VH are defined in the same row, a gap between any two neighboring via-holes among the n via-holes VH is n times the average size of the via-holes VH. In an alternative embodiment, when the via-holes VH are defined in the same column, the number of via-holes VH defined in the same column may be less than or equal to two.

Accordingly, even when the via-holes VH are defined in the first portion PT1 (refer to FIG. 5), rigidity may be uniform in the entire first portion PT1, and a problem of the occurrence of damage, such as cracks, in the first portion PT1 when folding the electronic device ED may be prevented. Particularly, it is possible to prevent a problem of the occurrence of damage such as cracks in the periphery of the via-holes VH when folding the electronic device ED.

The structure of the via-holes VH will be described with reference to FIG. 9A.

Figure 9A:
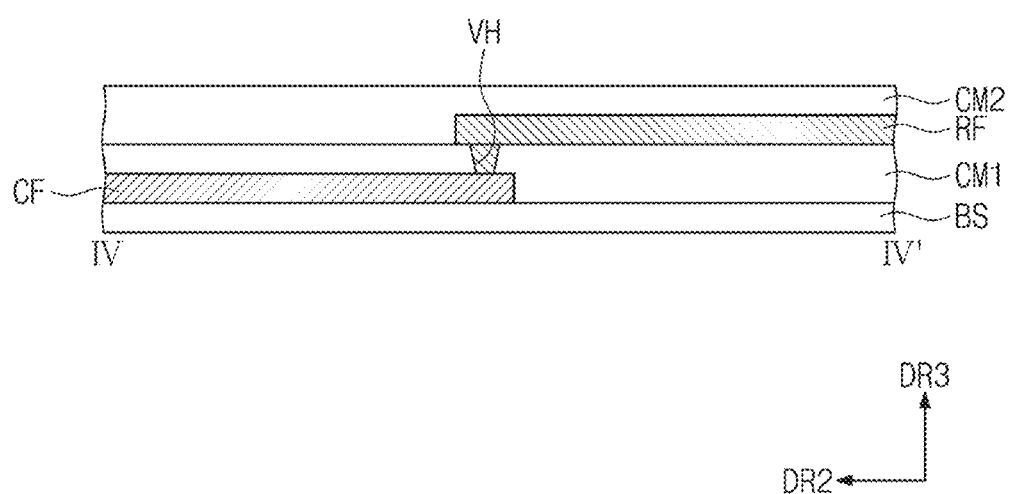
FIG. 9A is a cross-sectional view of an embodiment of a digitizer according to the invention.

FIG. 9A a cross-sectional view of an embodiment of the digitizer ZM according to the invention.

FIG. 9A is a cross-sectional view taken along line IV-IV' illustrated in FIG. 8A.

Referring to FIG. 9A, the via-hole VH may pass through the first cover layer CM1 disposed between the first conductive line CF and the second conductive line RF. The second conductive line RF may pass through the via-hole VH and be connected to the first conductive line CF. Accordingly, the second conductive line RF may be electrically connected to the first conductive line CF. In an embodiment, FIG. 9A illustrates that the second conductive line RF fills in the via-hole VH, but the invention is not limited thereto. In the via-hole VH, the first conductive line CF may be disposed, or a conductive material known in the art may electrically connect the first conductive line CF and the second conductive line RF.

A region in which the via-hole VH is defined and from which the first cover layer CM1 is removed further includes a conductive material, and thus, may have greater rigidity than a region in which the via-hole VH is not defined. That is, the via-hole VH may have greater rigidity than the periphery of the via-hole VH.

In the digitizer ZM of the invention, the via-holes VH are defined in the first portion PT1, where the via-holes VH are spaced apart from each other as described with reference to FIG. 8A to FIG. 8E, so that the rigidity of the first portion PT1 may be uniformly maintained. Accordingly, even when the electronic device ED (refer to FIGS. 1B and 1C) is folded, it is possible to prevent the occurrence of damage such as cracks in the first portion PT1, which is a folding region of the digitizer ZM.

The second portion PT2 corresponding to the first non-folding region NFA1 and the third portion PT3 corresponding to the second non-folding region NFA2 may also include a via-hole. However, when the electronic device ED is folded, stress applied to the second portion PT2 and the third portion PT3 is less than stress applied to the first portion PT1, so that in the second portion PT2 and the third portion PT3, it is less likely that cracks may be generated near via-holes due to non-uniform rigidity. Therefore, it is sufficient that the via-holes defined in the second portion PT2 and the third portion PT3 connect at least one of the first conductive lines CF and the second conductive lines RF, and the disposition structure is not particularly limited.

Figure 9B:
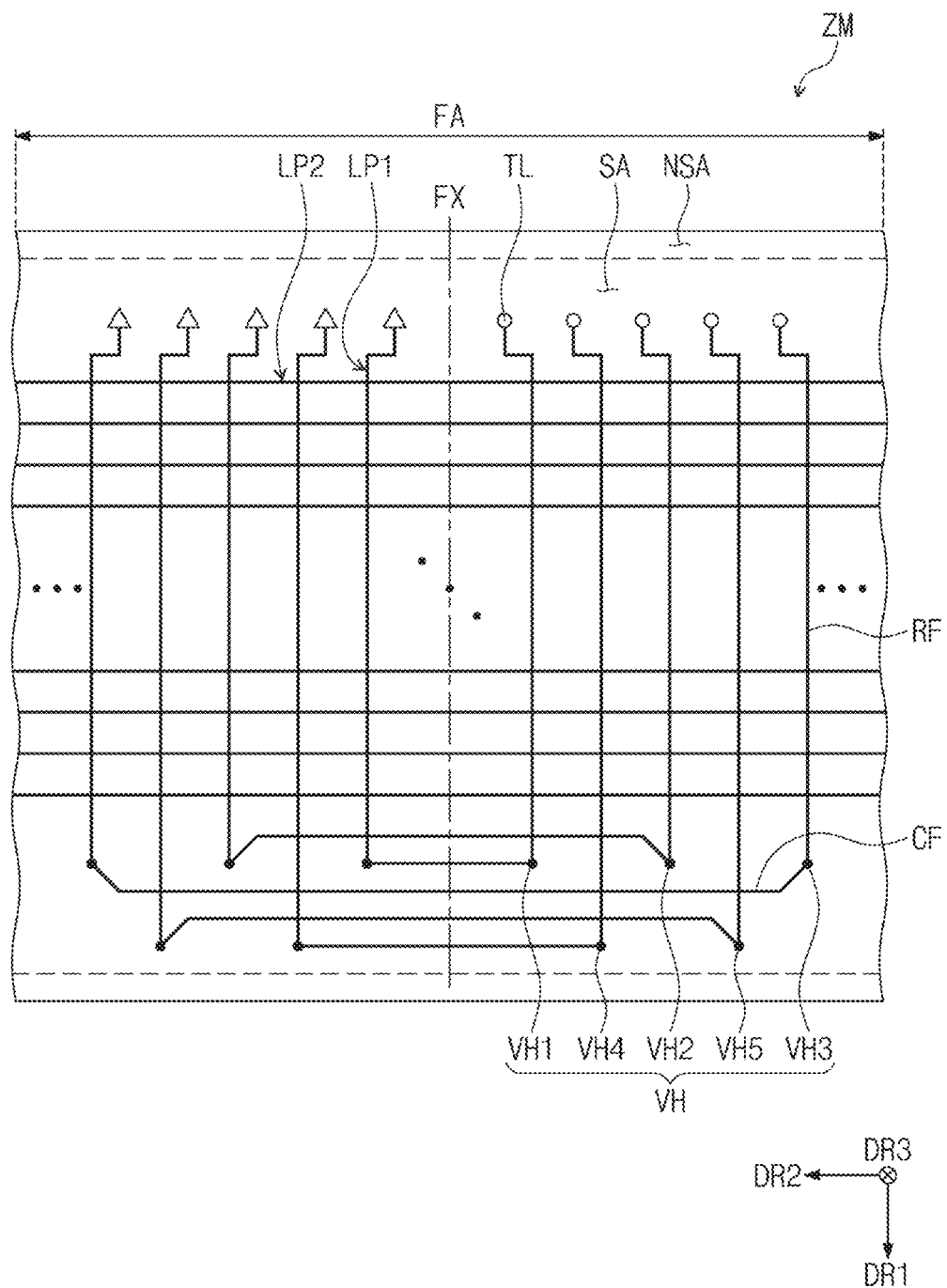
FIG. 9B is a plan view of a part of an embodiment of a digitizer according to the invention.

FIG. 9B a plan view of an embodiment of a portion of the digitizer ZM according to the invention.

FIG. 9B illustrates a portion of closed curves LP1 and LP2 disposed in the folding region FA of the digitizer ZM as an example.

Referring to FIG. 9B, at least one of the plurality of first conductive lines CF and the second conductive lines RF may form a plurality of closed curves LP1 and LP2 connected to each other. Specifically, the first conductive lines CF and the second conductive lines RF disposed in different layers may be connected to each other by the via-holes VH, when desired. In an embodiment, the via-holes VH are illustrated as including the first to fifth via-holes VH1, VH2, VH3, VH4, and VH5 illustrated in FIG. 8A.

The closed curves LP1 and LP2 may include first closed curves LP1 and second closed curves LP2. Each of the first closed curves LP1 may include a long side parallel to the first direction DR1 and a short side parallel to the second direction DR2. Each of the second closed curves LP2 may include a long side parallel to the second direction DR2 and a short side parallel to the first direction DR1.

The closed curves LP1 and LP2 may include terminals TL. Through the terminals TL, an alternating current signal may be sequentially provided to the closed curves LP1 and LP2 from the outside of the digitizer ZM. Terminals TL of the first closed curves LP1 are illustrated in FIG. 9B, and terminals of the second closed curves LP2 are omitted. The terminals of the second closed curves LP2 may be disposed at opposite ends of the digitizer ZM on the second direction DR2.

The shapes of the closed curves LP1 and LP2 illustrated in FIG. 9B are only illustrative, and the invention is not limited thereto.

Figure 10:
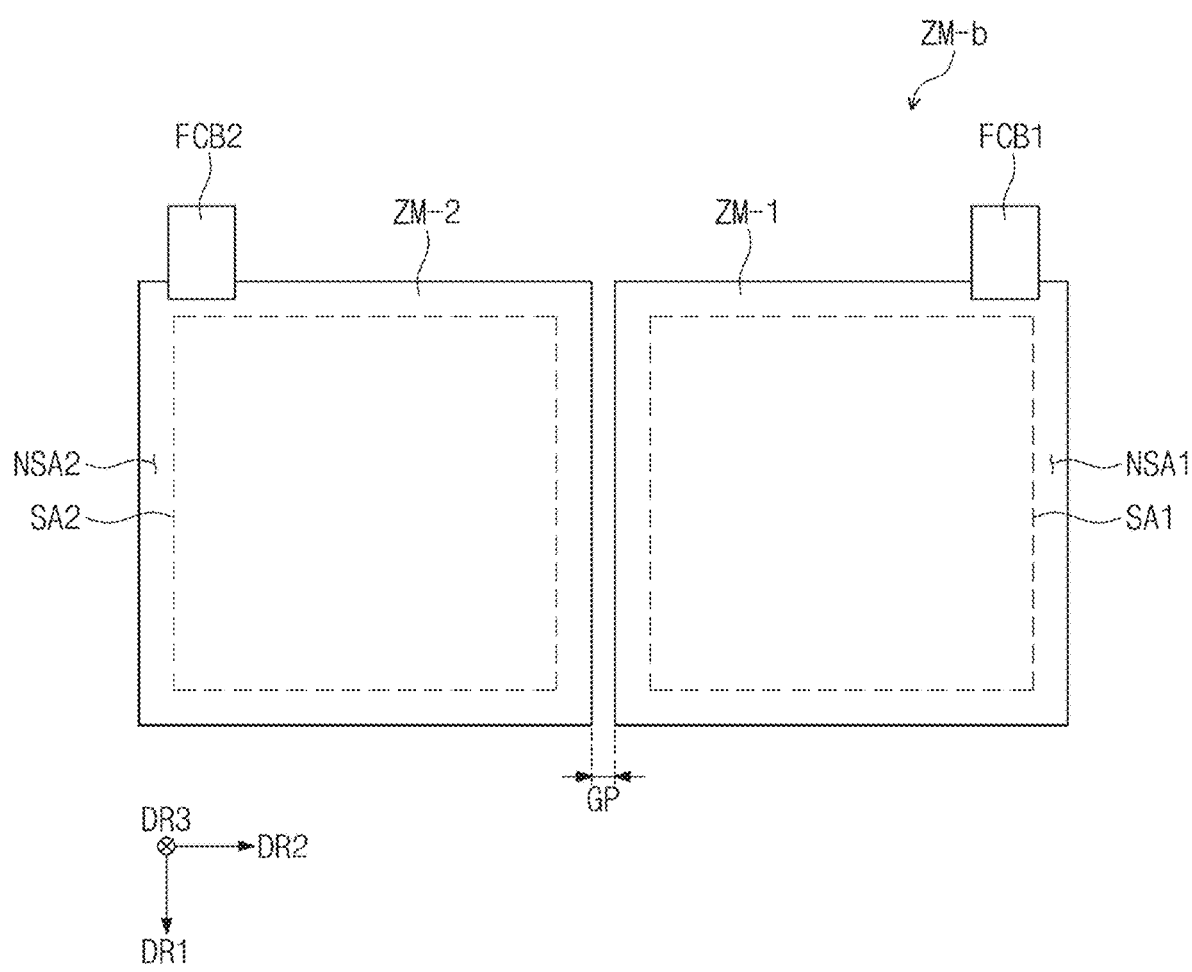
FIG. 10 is a plan view of an embodiment of a digitizer according to the invention.

FIG. 10 is a plan view of an embodiment of a digitizer ZM-b according to the invention.

Referring to FIG. 10, the digitizer ZM-b of an embodiment may include a first digitizer ZM-1 and a second digitizer ZM-2 spaced apart from each other. A first flexible circuit film FCB1 and a second flexible circuit film FCB2 may be electrically connected to the first digitizer ZM-1 and the second digitizer ZM-2, respectively. The first flexible circuit film FCB1 and the second flexible circuit film FCB2 may be connected to the same external circuit board. In an embodiment, the first flexible circuit film FCB1 and the second flexible circuit film FCB2 may each be connected to the main circuit board to which the flexible circuit film FCB is connected and which has been described with reference to FIG. 2, for example. The first flexible circuit film FCB1 and the second flexible circuit film FCB2 may be replaced with one circuit film.

The first digitizer ZM-1 and the second digitizer ZM-2 respectively include a first sensing region SA1 and a second sensing region SA2, and respectively include a first non-sensing region NSA1 and a second non-sensing region NSA2. The first non-sensing region NSA1 and the second non-sensing region NSA2 are disposed adjacent to the first sensing region SA1 and the second sensing region SA2, respectively. The configuration of the first digitizer ZM-1 and the configuration of the second digitizer ZM-2 may be substantially the same as each other. The description given above with respect to the digitizers ZM and ZM-a (refer to FIG. 5 to FIG. 7) may be equally applied to the first digitizer ZM-1 and the second digitizer ZM-2. Specifically, the description with respect to the first portion PT1 (refer to FIG. 5) may be equally applied to a portion overlapping the folding region FA (refer to FIG. 5) in the first digitizer ZM-1 and in the second digitizer ZM-2. Specifically, the description with respect to the second portion PT2 (refer to FIG. 5) and the description with respect to the third portion PT3 (refer to FIG. 5) may be equally applied to a portion overlapping the first non-folding region NFA1 (refer to FIG. 5) and a portion overlapping the second non-folding region NFA2 (refer to FIG. 5), respectively, in the first digitizer ZM-1 and in the second digitizer ZM-2. In addition, the above-described via-holes VH (refer to FIG. 8A to FIG. 8E) may be defined in a portion overlapping the folding region FA (refer to FIG. 5) in the first digitizer ZM-1 and in the second digitizer ZM-2.

Figure 11:
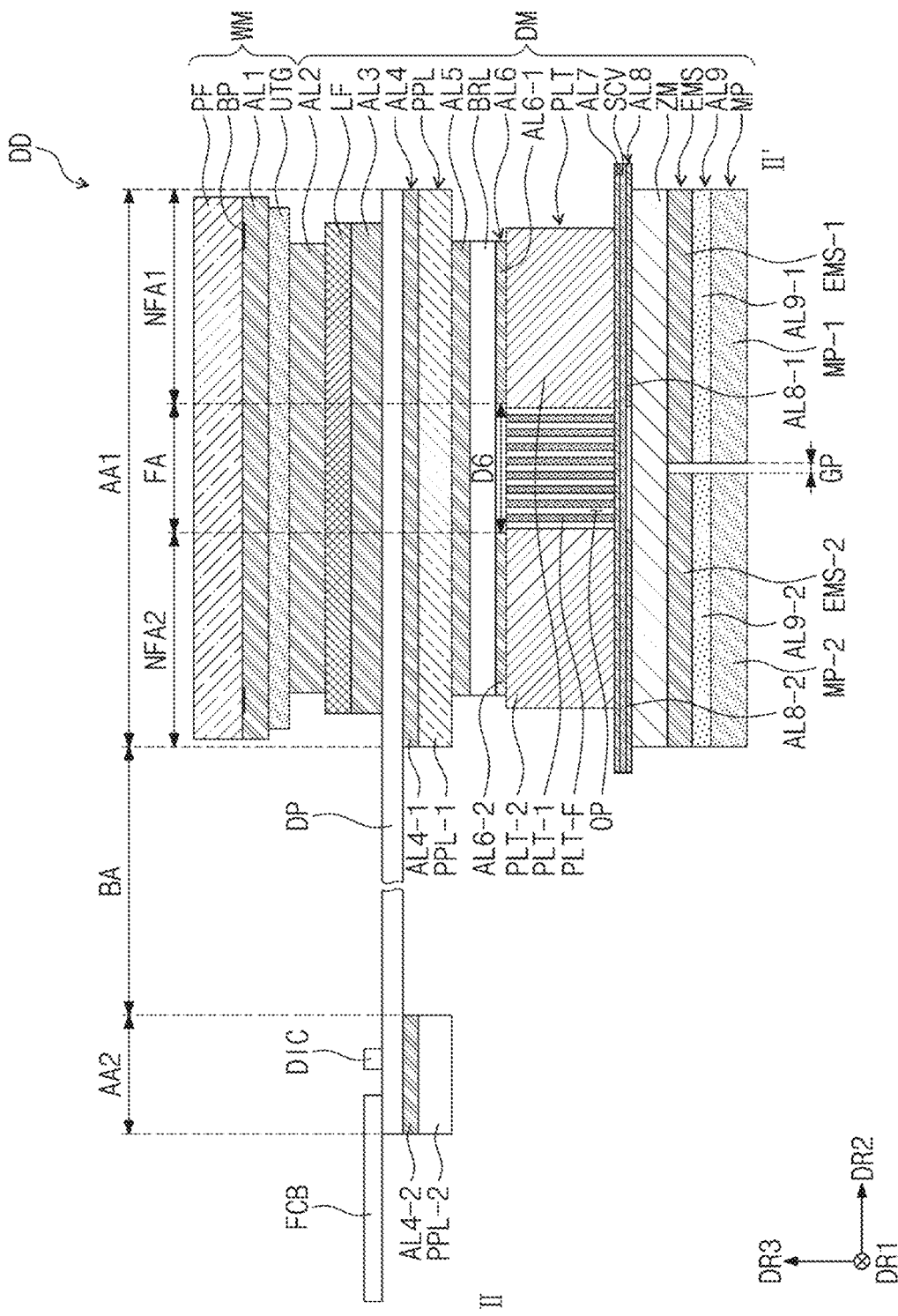
FIG. 11 is a cross-sectional view of an embodiment of a display device according to the invention.

FIG. 11 is a cross-sectional view of an embodiment of the display device DD according to the invention.

The display device DD of FIG. 11 may include the digitizer ZM of FIG. 9A.

Referring to FIG. 11, the display device DD includes the window module WM and the display module DM disposed below the window module WM.

The window module WM of an embodiment may include a window protection layer PF, a thin film glass substrate UTG, and a bezel pattern BP disposed below the window protection layer PF. The bezel pattern BP is a colored light-blocking film, and may be formed or provided, for example, by a coating method. The bezel pattern BP may include a base material and a dye or a pigment mixed in the base material. A first adhesive layer AL1 may be disposed between the window protection layer PF and the thin film glass substrate UTG.

The display module DM may include the optical film LF, the display panel DP, a panel protection layer PPL, a barrier layer BRL, a support layer PLT, a cover layer SCV, the digitizer ZM, the electromagnetic shielding layer EMS, a metal plate MP, and second to ninth adhesive layers AL2 to AL9. The second to ninth adhesive layers AL2 to AL9 may include an adhesive such as a pressure sensitive adhesive or an optical clear adhesive. In an embodiment of the invention, at least one of the above-described components may be omitted. In an embodiment, the metal plate MP and the ninth adhesive layer AL9 related thereto may be omitted, for example.

The optical film LF is disposed in the first region AA1 illustrated in FIG. 4. The optical film LF covers at least the active region DP-DA. The second adhesive layer AL2 bonds the optical film LF and the window module WM, and the third adhesive layer AL3 bonds the optical film LF and the display panel DP. FIG. 9A illustrates only the display panel DP, but as illustrated in FIG. 3, the input sensor IS may be further disposed between the display panel DP and the third adhesive layer AL3.

The panel protection layer PPL may be disposed below the display panel DP. The panel protection layer PPL may protect a lower portion of the display panel DP. The panel protection layer PPL may include a flexible plastic material. In an embodiment, the panel protection layer PPL may include polyethylene terephthalate, for example. In an embodiment of the invention, the panel protection layer PPL may not be disposed in the folding region FA. The panel protection layer PPL may include a first panel protection layer PPL-1 for protecting the first region AA1 of the display panel DP and a second panel protection layer PPL-2 for protecting the second region AA2 thereof.

The fourth adhesive layer AL4 adheres the panel protection layer PPL and the display panel DP. The fourth adhesive layer AL4 may include a first adhesive portion AL4-1 corresponding to the first panel protection layer PPL-1 and a second adhesive portion AL4-2 corresponding to the second panel protection layer PPL-2.

As illustrated in FIG. 4, when the bending region BA is bent, the second panel protection layer PPL-2 may be disposed together with the second region AA2 below the first region AA1 and the first panel protection layer PPL-1. Since the panel protection layer PPL is not disposed in the bending region BA, the bending region BA may be more easily bent.

The bending region BA has a predetermined curvature and a predetermined radius of curvature. In an embodiment, the radius of curvature may be about 0.1 millimeter (mm) to about 0.5 mm. A bending protection layer is disposed at least in the bending region BA. The bending protection layer may overlap the bending region BA, the first region AA1, and the second region AA2. The bending protection layer may be disposed in a portion of the first region AA1 and a portion of the second region AA2.

The bending protection layer may be bent together with the bending region BA. The bending protection layer protects the bending region BA from an external impact, and control a neutral plane of the bending region BA. The bending protection layer controls stress of the bending region BA such that the neutral plane becomes closer to signal lines disposed in the bending region BA.

The fifth adhesive layer AL5 bonds the panel protection layer PPL and the barrier layer BRL. The barrier layer BRL may be disposed below the panel protection layer PPL. The barrier layer BRL may increase resistance against compressive force caused by external pressing. Therefore, the barrier layer BRL may serve to prevent the deformation of the display panel DP. The barrier layer BRL may include a flexible plastic material such as polyimide or polyethylene terephthalate. In addition, the barrier layer BRL may be a colored film with low light transmittance. The barrier layer BRL may absorb light incident from the outside. In an embodiment, the barrier layer BRL may a black plastic film, for example. When the display device DD is viewed from an upper side of a window protection layer PF, elements disposed below the barrier layer BRL may not be visually recognized by a user.

The sixth adhesive layer AL6 bonds the barrier layer BRL and the support layer PLT. The sixth adhesive layer AL6 may include a first adhesive portion AL6-1 and a second adhesive portion AL6-2 spaced apart from each other. A separation distance D6 (or a gap) between the first adhesive portion AL6-1 and the second adhesive portion AL6-2 corresponds to a width of the folding region FA, and is greater than a gap GP to be described later. In the illustrated embodiment, the first adhesive portion AL6-1 and the second adhesive portion AL6-2 are defined as different portions of one adhesive layer, but the invention is not limited thereto. When the first adhesive portion AL6-1 is defined as one adhesive layer (e.g., a first adhesive layer), the second adhesive portion AL6-2 may be defined as the other adhesive layer (e.g., a second adhesive layer).

The support layer PLT is disposed below the barrier layer BRL. The support layer PLT supports components disposed on an upper side of the support layer, and maintains an unfolded state and a folded state of the display device DD. The support layer PLT may include at least a first support portion PLT-1 corresponding to the first non-folding region NFA1 and having insulation properties and a second support portion PLT-2 overlapping the second non-folding region NFA2 and having insulation properties. The first support portion PLT-1 and the second support portion PLT-2 may be spaced apart from each other in the second direction DR2.

The support layer PLT may further include a folding portion PLT-F corresponding to the folding region FA, disposed between the first support portion PLT-1 and the second support portion PLT-2, and a plurality of openings OP may be defined in the folding portion PLT-F. During a folding operation of the display device DD, the folding portion PLT-F may prevent foreign substances from penetrating into an open region of the barrier layer BRL from the first support portion PLT-1 and the second support portion PLT-2. In an embodiment of the invention, the folding portion PLT-F may be omitted.

The folding portion PLT-F has a greater elastic modulus than that of the first support portion PLT-1 and the second support portion PLT-2. The folding portion PLT-F may include a material having an elastic modulus of about 60 gigapascals (GPa) or greater, and may include a metal material such as stainless steel. In an embodiment, the folding portion PLT-F may include SUS 304, for example, but the invention is not limited thereto. The folding portion PLT-F may include various metal materials.

The first support portion PLT-1 and the second support portion PLT-2 may include plastic, fiberglass reinforced plastic, or glass. The plastic may include polyimide or polyethylene terephthalate, but is not particularly limited. The first support portion PLT-1 and the second support portion PLT-2 may include the same material.

In at least partial regions of the support layer PLT corresponding to the folding region FA, the plurality of openings OP may be defined. The flexibility of the support layer PLT is increased by the openings OP. Since the sixth adhesive layer AL6 is not disposed in a region corresponding to the folding region FA, the flexibility of the support layer PLT may be increased.

The seventh adhesive layer AL7 bonds the support layer PLT and the cover layer SCV, and the eighth adhesive layer AL8 bonds the cover layer SCV and the digitizer ZM. The cover layer SCV may cover the openings OP defined in the support layer PLT. The cover layer SCV may have a lower elastic modulus than that of the support layer PLT. In an embodiment, the cover layer SCV may include thermoplastic polyurethane, rubber, and silicon, for example, but the invention is not limited thereto.

The cover layer SCV may be manufactured in a sheet form and attached to the support layer PLT. The eighth adhesive layer AL8 may include a first adhesive portion AL8-1 and a second adhesive portion AL8-2 spaced apart from each other. A separation distance between the first adhesive portion AL8-1 and the second adhesive portion AL8-2 corresponds to the width of the folding region FA, and is greater than the gap GP to be described later. Since the eighth adhesive layer AL8 is not disposed in a region corresponding to the folding region FA, the flexibility of the cover layer SCV may be increased. The separation distance between the first adhesive portion AL8-1 and the second adhesive portion AL8-2 of the eighth adhesive layer AL8 may correspond to the separation distance D6 between the first adhesive portion AL6-1 and the second adhesive portion AL6-2 of the sixth adhesive layer AL6.

Among the above-described components, a component between the display panel DP and the digitizer ZM may correspond to the protection member PM illustrated in FIG. 3.

The digitizer ZM may detect a position at which the electromagnetic pen SP (refer to FIG. 1A) is adjacent on the window module WM. The description given above with respect to FIG. 5 to FIG. 9A may be equally applied to the digitizer ZM, and a detailed description thereof will be omitted.

The electromagnetic shielding layer EMS is disposed below the digitizer ZM. In order to prevent an electromagnetic wave generated from the electronic module EM illustrated in FIG. 2 from affecting the digitizer ZM as noise, the electromagnetic shielding layer EMS may be added.

The electromagnetic shielding layer EMS may include a first electromagnetic shielding layer EMS-1 and a second electromagnetic shielding layer EMS-2. The first electromagnetic shielding layer EMS-1 and the second electromagnetic shielding layer EMS-2 may be spaced apart with a predetermined gap GP interposed therebetween. In an embodiment, the gap GP may be about 0.3 mm to about 3 mm, and may correspond to the folding region FA.

In the illustrated embodiment, the electromagnetic shielding layer EMS may include a magnetic metal powder layer. The magnetic metal powder layer may be directly provided on a lower surface of the digitizer ZM through coating and curing processes. In an embodiment of the invention, the electromagnetic shielding layer EMS may be omitted.

The ninth adhesive layer AL9 bonds the electromagnetic shielding layer EMS and the metal plate MP. The ninth adhesive layer AL9 may include a first adhesive portion AL9-1 and a second adhesive portion AL9-2 spaced apart from each other. The metal plate MP may include a first metal plate MP-1 and a second metal plate MP-2 respectively attached to the first adhesive portion AL9-1 and the second adhesive portion AL9-2. The metal plate MP may increase heat dissipation properties, and may protect components on an upper side of the metal plate MP from external pressure generated during a manufacturing process of a display device.

Among the above-described components, components disposed on a lower portion of the digitizer ZM may correspond to the lower member LM illustrated in FIG. 3.

Figure 12:
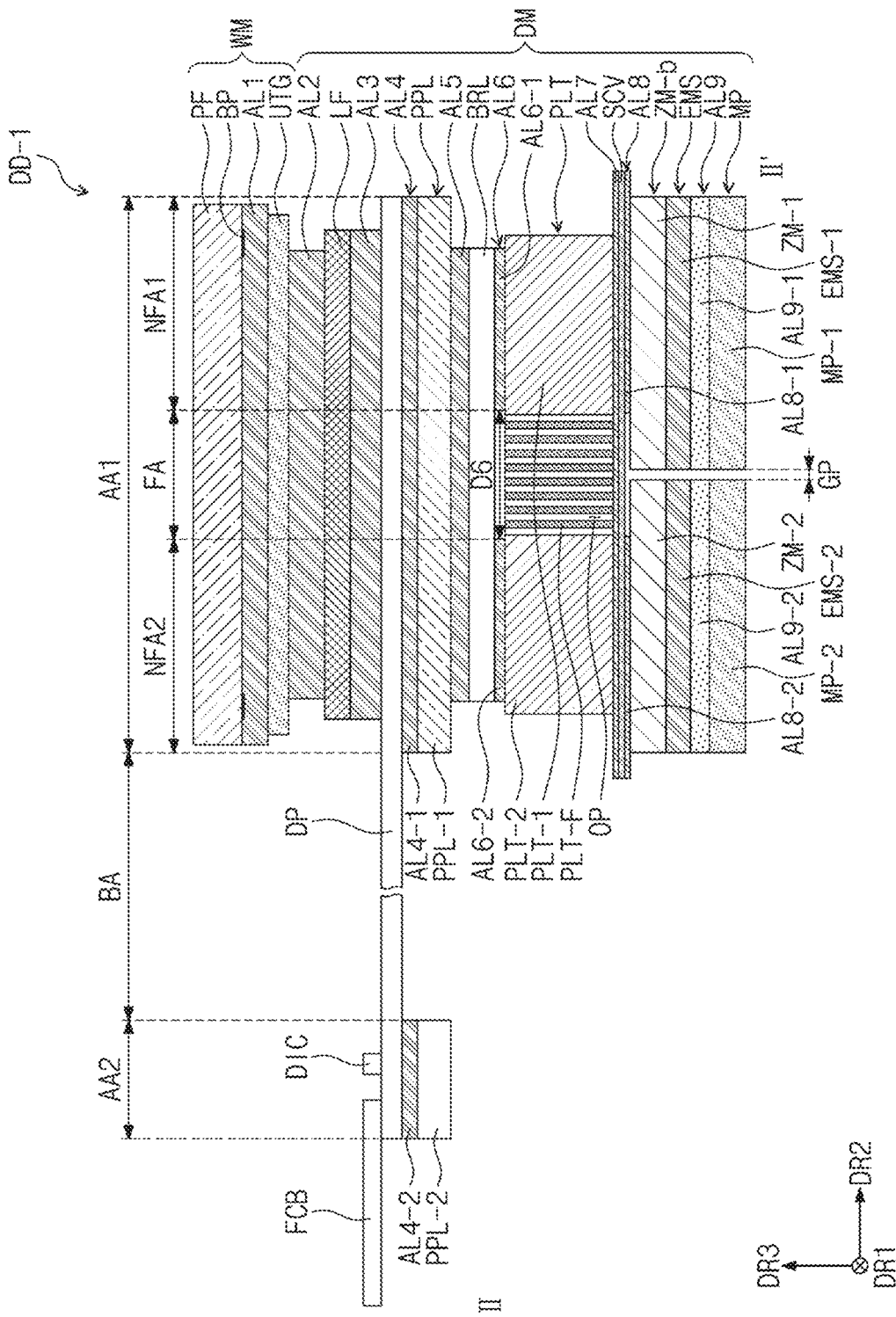
FIG. 12 is a cross-sectional view of an embodiment of a display device according to the invention.

FIG. 12 is a cross-sectional view of an embodiment of a display device DD-1 according to the invention.

The display device DD-1 of FIG. 12 is different from the display device DD of FIG. 11 in that it includes the digitizer ZM-b of FIG. 10.

Referring to FIG. 12, the digitizer ZM-b may include the first digitizer ZM-1 and the second digitizer ZM-2. The first digitizer ZM-1 may be attached to the first adhesive portion AL8-1 of the eighth adhesive layer AL8, and the second digitizer ZM-2 may be attached to the second adhesive portion AL8-2 of the eighth adhesive layer AL8. The first digitizer ZM-1 and the second digitizer ZM-2 are spaced apart with the predetermined gap GP interposed therebetween. In an embodiment, the gap GP may be about 0.3 mm to about 3 mm, and may correspond to the folding region FA.

The first electromagnetic shielding layer EMS-1 and the second electromagnetic shielding layer EMS-2 may respectively correspond to the first digitizer ZM-1 and the second digitizer ZM-2.

The first digitizer ZM-1 may overlap at least a portion of the folding region FA and the first non-folding region NFA1. The second digitizer ZM-2 may overlap at least a portion of the folding region FA and the second non-folding region NFA2. The predetermined gap GP overlapping the folding region FA may be defined in the digitizer ZM-b, and thus, may mitigate stress applied to a folding portion when the display device DD-1 is folded.

The via-holes VH overlapping the folding region FA may be defined in the digitizer ZM of the invention, and the via-holes VH may be defined in different rows from each other and different columns from each other. In an alternative embodiment, when n via-holes VH are defined in the same row, a gap between any two neighboring via-holes among the n via-holes VH is n times the average size of the via-holes VH. In an alternative embodiment, when the via-holes VH are defined in the same column, the number of via-holes VH defined in the same column may be less than or equal to two. Accordingly, the digitizer ZM may exhibit uniform rigidity in a portion overlapping the folding region FA.

The display device DD of the invention includes the digitizer ZM of the invention, and thus, may minimize defects such as cracks generated around the via-holes VH in the digitizer ZM during folding. Accordingly, the reliability of the display device DD may be improved.

According to the invention, cracks generated in a folding region of a digitizer when a display device is folded may be minimized.

According to the invention, a foldable display device with improved reliability may be provided.

Although the invention has been described with reference to a preferred embodiment of the invention, it will be understood by those skilled in the art that various changes in form and details may be made therein without departing from the spirit and scope of the invention as set forth in the following claims. Accordingly, the technical scope of the invention is not intended to be limited to the contents set forth in the detailed description of the specification, but is intended to be defined by the appended claims.

What is claimed is:
1. A display device comprising:
   a display panel including a first non-folding region, a second non-folding region, and a folding region disposed between the first non-folding region and the second non-folding region; and
   a digitizer including:

a base layer;
first conductive lines disposed on the base layer;
a first cover layer disposed on the first conductive lines;
second conductive lines disposed on the first cover layer;
a second cover layer disposed on the second conductive lines,
wherein a plurality of via-holes passes through the first cover layer,
a second conductive line of the second conductive lines is electrically connected to a first conductive line of the first conductive lines through the plurality of via-holes; and
wherein
the first non-folding region, the folding region, and the second non-folding region are distinguished based on a first direction,
the plurality of via-holes overlaps the folding region, and
a minimum of shortest lengths of gaps along the first direction between all adjacent via-holes immediately next to each other among the plurality of via-holes is equal to or greater than an average diameter of the plurality of via-holes.

2. The display device of claim 1, wherein the first conductive line of the first conductive lines and the second conductive line of the second conductive lines connected by the via-holes define a closed curve.

3. The display device of claim 1, wherein a number of via-holes defined in a same column among the plurality of via-holes is 2 or less.

4. The display device of claim 3, wherein when n via-holes are defined in a same row among the plurality of via-holes, where n is an integer of 2 or greater, a distance between any two neighboring via-holes in the same row among the n via-holes is n times the average size of the plurality of via-holes.

5. The display device of claim 3, wherein when two via-holes are defined in the same column among the via-holes, a distance between the two via-holes is two times the average size of the plurality of via-holes.

6. The display device of claim 3, wherein the plurality of via-holes is defined in different columns from each other.

7. The display device of claim 6, wherein the plurality of via-holes is defined in different rows from each other.

8. The display device of claim 3, wherein the plurality of via-holes comprises a first via-hole, a second via-hole, a third via-hole, a fourth via-hole, and a fifth via-hole, wherein:
the first via-hole, the third via-hole, and the fifth via-hole are defined in a first row;
the second via-hole and the fourth via-hole are defined in a second row; and
the first to fifth via-holes are respectively defined in first to fifth columns.

9. The display device of claim 1, wherein:
each of the first conductive lines is extended in the first direction in a plan view; and
each of the second conductive lines is extended in a second direction crossing the first direction.

10. The display device of claim 1, wherein:
the first non-folding region, the folding region, and the second non-folding region are distinguished based on a first direction;
each of the first conductive lines is extended in a second direction crossing the first direction in a plan view; and
each of the second conductive lines is extended in the first direction in the plan view.

11. The display device of claim 1, wherein the digitizer comprises a first portion overlapping the folding region and being foldable around a virtual folding axis, a second portion overlapping the first non-folding region, and a third portion overlapping the second non-folding region.

12. The display device of claim 11, wherein a via-hole of the plurality of via-holes is defined in the first portion.

13. The display device of claim 1, wherein:
the digitizer comprises a first digitizer and a second digitizer spaced apart from each other, wherein the first digitizer overlaps at least a portion of the folding region and the second non-folding region, and the second digitizer overlaps at least a portion of the folding region and the first non-folding region; and
the plurality of via-holes is defined in the first digitizer and the second digitizer.

14. The display device of claim 1, further comprising an electromagnetic shielding layer disposed on a first surface of the digitizer which is opposite to a second surface on which the display panel is disposed.

15. A display device comprising:
a window module; and
a display module disposed on the window module and including:
a first non-folding region, a folding region, and a second non-folding region sequentially defined based on a first direction;
a display panel; and
a digitizer including:
first conductive lines extended in a second direction crossing the first direction; and
second conductive lines extended in the first direction and disposed in a different layer from the first conductive lines, and disposed on a first surface of the display panel which is opposite to a second surface of the display panel on which the window module is disposed,
wherein a plurality of via-holes overlapping the folding region is defined in the digitizer,
wherein a second conductive line of the second conductive lines is electrically connected to a first conductive line of the first conductive lines through the plurality of via-holes, and
wherein a minimum of shortest lengths of gaps along the first direction between all adjacent via-holes immediately next to each other among the plurality of via-holes is equal to or greater than an average diameter of the plurality of via-holes.

16. The display device of claim 15, wherein a number of via-holes defined in a same column among the plurality of via-holes is 2 or less.

17. The display device of claim 16, wherein when a number of via-holes defined in one row is n, where n is an integer of 2 or greater, a distance between any two neighboring via-holes among the n via-holes is n times the average size of the plurality of via-holes.

18. The display device of claim 15, wherein the display module further comprises a lower member disposed on a first surface of the digitizer opposite to a second surface of the digitizer facing the display panel is disposed, wherein the lower member includes at least one of an electromagnetic shielding layer, a heat dissipating layer, a cushion layer, or a metal plate.

19. A display device comprising:
a display panel including a first non-folding region, a second non-folding region, and a folding region disposed between the first non-folding region and the second non-folding region; and a digitizer including:
- a plurality of insulation layers;
- first conductive lines and second conductive lines disposed between the plurality of insulation layers; and
- a first portion at least a portion of which overlaps the folding region and which has flexibility;
- a second portion overlapping the first non-folding region; and
- a third portion overlapping the second non-folding region;

wherein a plurality of via-holes passes through an insulation layer of the plurality of insulation layers, overlaps the display panel, and is defined in the first portion;

a second conductive line of the second conductive lines is connected to a first conductive line of the first conductive lines through the plurality of via-holes and constitute a closed curve;

the first non-folding region, the folding region, and the second non-folding region are distinguished based on a first direction; and a minimum of shortest lengths of spacing gaps along the first direction between all adjacent neighboring via-holes immediately next to each other among the via-holes is greater than or equal to an average size value of the plurality of via-holes.

* * * * *